United States Patent
Baber et al.

(10) Patent No.: US 6,658,485 B1
(45) Date of Patent: Dec. 2, 2003

(54) DYNAMIC PRIORITY-BASED SCHEDULING IN A MESSAGE QUEUING SYSTEM

(75) Inventors: Stephen C. Baber, Raleigh, NC (US); Kathryn H. Britton, Chapel Hill, NC (US); Barron Cornelius Housel, III, Chapel Hill, NC (US); Ajamu Akinwunmi Wesley, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/174,974

(22) Filed: Oct. 19, 1998

(51) Int. Cl.[7] .................................................. G06F 9/46
(52) U.S. Cl. ....................................... 709/314; 709/103
(58) Field of Search ................................. 709/100, 102, 709/103, 310, 313, 314, 315, 316

(56) References Cited

U.S. PATENT DOCUMENTS

| | | | | |
|---|---|---|---|---|
| 5,218,676 A | * | 6/1993 | Ben-Ayed et al. | 709/240 |
| 5,371,859 A | * | 12/1994 | Lennartsson | 710/114 |
| 5,524,253 A | * | 6/1996 | Pham et al. | 703/27 |
| 5,805,825 A | * | 9/1998 | Danneels et al. | 709/217 |
| 5,835,765 A | * | 11/1998 | Matsumoto | 709/102 |
| 5,892,907 A | * | 4/1999 | Harper et al. | 709/200 |
| 5,999,964 A | * | 12/1999 | Murakata et al. | 709/201 |

* cited by examiner

Primary Examiner—St. John Courtenay, III
Assistant Examiner—Van Hoa Nguyen
(74) Attorney, Agent, or Firm—Jeanine S. Ray-Yarletts; Marcia L. Doubet

(57) ABSTRACT

A method, system, and computer-readable code with which a scheduling system can be implemented that allows a sender and a receiver to change priorities of queued messages. A technique is also defined for providing a receiver with an advance notice of intended message priority, enabling the receiver to request a priority change before transmission begins. These techniques provide the flexibility to respond to changes in dynamic, volatile network environments, as well as changes in user's wishes or requirements. A ranking technique is defined, whereby requests to change priority may be accepted or denied through a ranking algorithm that resolves potential conflicts in desired transmission priority using proposals exchanged by the parties (e.g. during connection establishment).

22 Claims, 20 Drawing Sheets

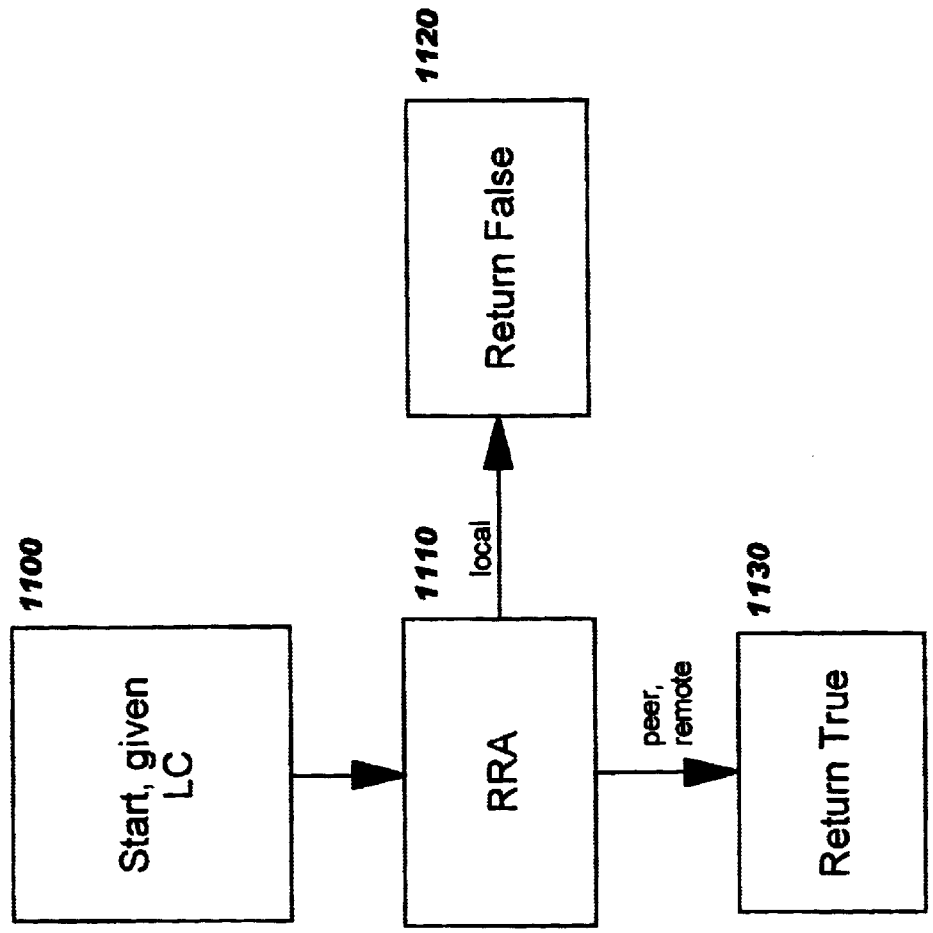

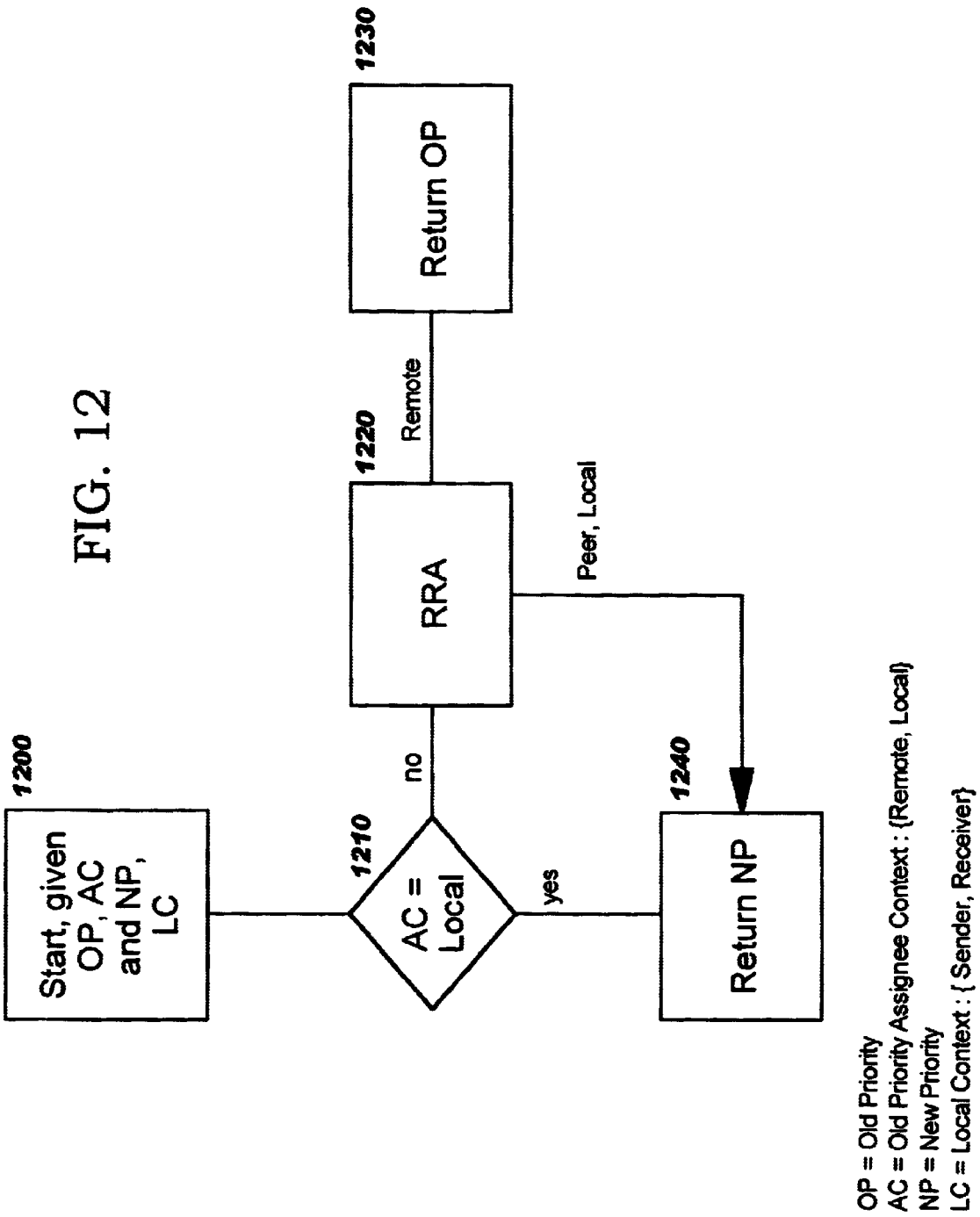

DYNAMIC PRIORITY-BASED SCHEDULING IN A MESSAGE QUEUING SYSTEM

BACKGROUND OF THE INVENTION

1. Field of the Invention

The present invention relates to a computer system, and deals more particularly with a method, system, and computer-readable code that enables a sending or receiving application to dynamically change transmission priorities of queued messages.

2. Description of the Related Art

Message queuing is a technique whereby application programs communicate with each other using messages and queues. The applications may be running on the same computer, or on different computers. When one application wishes to send a message to another application, it passes the message to a queue manager, which then forwards the message to the queue manager used by the target application. The target application then retrieves the message by making a request of its queue manager. When the applications are running on the same computer, they typically use a shared queue manager; when the applications are on different computers, each computer may use a different queue manager. This approach enables message exchange to occur asynchronously, because the application generating the message does not need to await an acknowledgement from the target application. This, in turn, also allows the message sending process to operate very quickly. Examples of commercially-available message queuing systems are MQSeries from the International Business Machines Corporation ("IBM"), and Microsoft Corporation's Message Queue (MSMQ) product. ("MQSeries" is a registered trademark of IBM.) Reference may be made to "IBM Messaging and Queuing Series—Technical Reference" (SC33-0850-01, 1993) for a more detailed description of messaging and queuing.

It is commonplace today for computer users to connect their machines to other computers, known as "servers", through a network. The network may be a private network, such as a corporate intranet of networked computers that is accessible only to computer users within that corporation. Or, it may a public network, such as the Internet or World Wide Web. The Internet is a vast collection of computing resources, interconnected as a network, from sites around the world.

The user may connect his computer to a server using a "wired" connection, or a "wireless" connection. Wired connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a Local Area Network (LAN) card such as Token Ring or Ethernet; using a cellular modem to establish a wireless connection; etc. The user's computer may be any type of computer processor, including laptop, handheld or mobile computers; vehicle-mounted devices; desktop computers; mainframe computers; etc., having processing and communication capabilities. The remote server, similarly, can be one of any number of different types of computer which have processing and communication capabilities. These techniques are well known in the art, and the hardware devices and software which enable their use are readily available. Hereinafter, the user's computer will be referred to as a "workstation", and use of the terms "workstation" or "server" refers to any of the types of computing devices described above.

A user of the Internet typically accesses and uses the Internet by establishing a network connection through the services of an Internet Service Provider (ISP). An ISP provides computer users the ability to dial a telephone number using their workstation modem (or other connection facility, such as satellite transmission), thereby establishing a connection to a remote computer owned or managed by the ISP. This remote computer then makes services available to the user's computer, hence such computers are often referred to as "servers". While many networking applications exchange messages synchronously, message queuing systems may be used in this environment where communication is asynchronous. Typical services include: queuing mail to be delivered when a user connects to the server; distributing data base updates to subscribing clients; and delivering application data files that have been modified, where the target of the delivery may be a collection of occasionally-connected mobile client user systems. Similar facilities are typically available when the user connects to a server in an intranet, or an extranet (that is, a network owned or managed by another company, and which provides services in a similar manner to the Internet or an intranet).

These are examples of a client-server model of computing, where the machine at which the user requests information is referred to as the client, and the computer that locates the information and returns it to the client is the server. The client-server model may be extended to what is referred to as a "three-tier architecture". This architecture places the server in the middle tier, where the added tier typically represents data repositories of information that may be accessed by the server as part of the task of processing the client's request. This three-tiered architecture recognizes the fact that many client requests do not simply require the location and return of static data, but require an application program to perform processing of the client's request in order to dynamically create the data to be returned.

As more people connect their workstations to networks, the number of messages and files being sent is skyrocketing. (Hereinafter, the terms "message" and "file" are used interchangeably when referring to data being sent through a network, unless otherwise stated.) Coupled with this increase in the number of network users and files is an increase in the size of the files commonly being sent. For example, a short e-mail message with a relatively simple graphic image attached may be on the order of several hundred thousand bytes of data. Users may send and receive many such files over the course of a day's work, or in their personal network communications. At the same time, the popularity of limited-storage workstations (such as handheld computers), which a user may use in disconnected mode for some period of time, is also growing. "Disconnected mode" refers to using the workstation without currently having a connection to a network. For example, a salesperson may use a handheld computer to record sales information throughout the workday while working at customer locations, and only connect to a network to transmit the data to his company's server at the end of the workday. Or, a user may work with data stored locally on his workstation throughout the day, making brief network connections when he has data to transmit, or wishes to see if there is data for him to receive from a server (e.g. by connecting to his e-mail service to see if he has any new messages). This latter scenario is common where a user is being charged for network connection time, such as when he uses a cellular service, as a way of reducing costs by minimizing the duration of the network connection. Many other examples of using devices in disconnected mode are possible.

Priorities are often assigned to messages being sent through the network, either by the sending application or directly by the user, in order to control the use of network bandwidth. Higher priority messages are then sent before lower priority messages. Aging algorithms are sometimes used to increase the priority of messages, in order to limit the amount of time a message spends waiting to be sent. These algorithms typically monitor the wait time for messages, and increase the message priority each time the wait exceeds one or more predefined threshold values.

Other than aging algorithms, priority mechanisms are generally static: once an application has sent a message, it no longer has the ability to affect the priority of message transmission. Also, the priority is usually set by the sending application. The receiving application has no means to affect the network priority of in-transit data.

There are many situations in which conditions can change between the time messages are queued for transmission, and when the messages are actually sent, where it would be beneficial to change the message priority to reflect the changed conditions. In a mobile environment, for example, when the user runs software applications in disconnected mode as discussed above, the time period between queuing a message and the actual transmission of the message can be relatively long. Or, network conditions such as server outages or route congestion may result in messages being queued for long periods before being transmitted. The longer the delay, the more likely it is that conditions related to message priority will change. The user may simply change his mind about the priority assigned to a transmission, or other more important needs may arise that reduce the desired priority of previously-queued messages. For example, the highest defined priority may have been assigned for transmitting a data object that will require a significant length of time to transmit, and while that message is waiting, something even more important needs to be sent. Or, a server application may queue a file containing updated personnel instructions, and set a low priority for transmitting the file to all the managers in the company—but a specific manager may need this information immediately, to answer a telephone query. Conditions at the receiving side may affect the desired transmission priority from the sender. For example, the urgency of receiving a large data object may change when more important data is needed at the receiver. A constrained device, such as a handheld device, may wish to associate different priorities with receiving data when it is remotely connected (and may have a slow unreliable connection and very limited storage capacity available) versus when it is docked (and may have a faster connection and much greater amount of storage available through its docking connection). Or, changes in network conditions (such as congestion due to heavy traffic) may warrant a change in the relative priority of large data transmissions. However, there are no known techniques that allow dynamically changing the priority of messages that are already in transit—that is, messages which are either queued waiting for transmission, or are in the process of being transmitted, or have been received but not delivered to the application—in order to respond to changing conditions.

Accordingly, what is needed is a technique that enables senders and receivers of messages to dynamically change the transmission priority of in-transmit messages to account for changed conditions. The technique of the present invention enables the sending application or the receiving application (and their human users) to change transmission priorities of messages dynamically. A technique is also defined for providing a receiver with an advance notice of intended message priority, enabling the receiver to request a priority change before transmission begins. These techniques provide the flexibility to respond to changes in dynamic, volatile network environments, as well as changes in the user's wishes or requirements. A ranking technique is defined, whereby requests to change priority may be accepted or denied through a ranking algorithm that resolves potential conflicts in desired transmission priority.

SUMMARY OF THE INVENTION

An object of the present invention is to provide a technique with which sending applications or receiving applications (and their human users) can change transmission priorities of in-transit messages dynamically.

Another object of the present invention is to provide a technique with which a receiver can receive an advance notice of intended message priority, enabling the receiver to request a priority change before transmission begins.

It is another object of the present invention to provide a ranking technique for use with dynamic priority change requests, whereby requests to change priority may be accepted or denied through a ranking algorithm that resolves potential conflicts in desired transmission priority.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a software-implemented technique for use in a computing environment connected to a network, for implementing a scheduling system that allows a sender and a receiver to change priorities of queued messages, comprising: a sending application operating at the sender; a receiving application operating at the receiver; a plurality of data objects to be sent from the sending application to the receiving application; a queuing system at each of the sender and receiver, comprising a persistent message store, a subprocess for queuing a plurality of messages in the message store, and a subprocess for dequeuing the queued messages; a subprocess for requesting a change from an existing priority of a specified data object to a new priority, wherein the specified data object may be represented in the message store by one or more of the queued messages; a subprocess for locating any of the queued messages representing the specified data object; a subprocess for determining if the existing priority of the data object will be changed to the new priority; and a subprocess for modifying an order of delivery of the located messages when the subprocess for determining has a positive response. Preferably, the subprocess for modifying further comprises changing a priority of each of the located messages to the new priority. The subprocess for determining preferably further comprises using a priority resolution subprocess, which preferably further comprises a subprocess for using rank proposals for each of the sender and receiver, where the rank proposals are exchanged at least once between said sender and said receiver. The rank proposals are preferably one of: local primary, remote primary, sender primary, receiver primary, and peer. Additionally, the technique may further comprise a subprocess for issuing an advance notification of an intended priority to be used as the existing priority for a subsequently-sent data object. The subprocess for requesting a change may further comprise a subprocess for accepting the change request from a user of either the sending application or the receiving application.

The present invention will now be described with reference to the following drawings, in which like reference numbers denote the same element throughout.

BRIEF DESCRIPTION OF THE DRAWINGS

FIGS. 4–13 provide flowcharts of the logic that may be used to implement a preferred embodiment of the present invention.

DESCRIPTION OF THE PREFERRED EMBODIMENT

Figure 1:
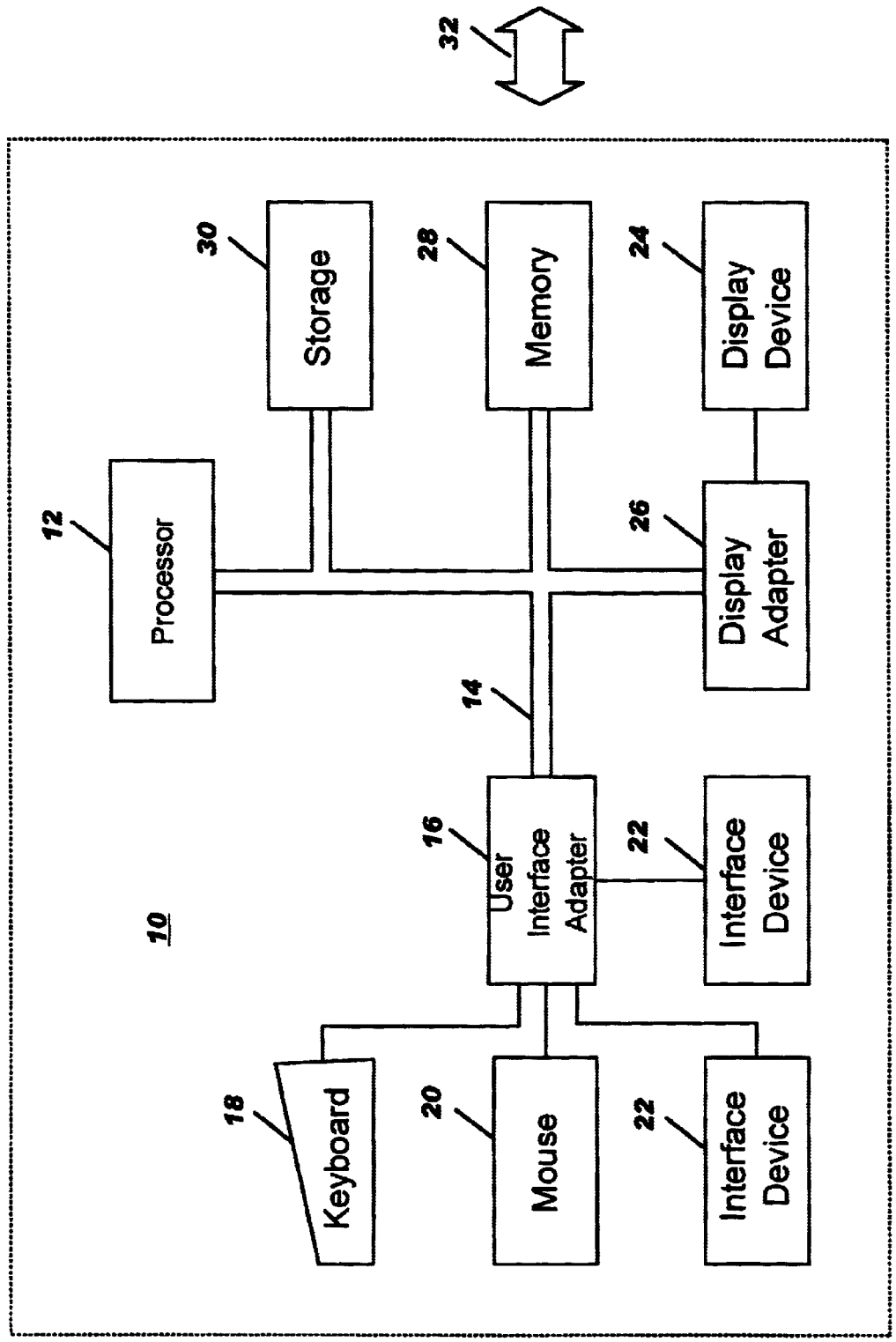
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a LAN or a wide area network (WAN), or the workstation 10 can be a client in a client/server arrangement with another computer, etc. All of these configurations, as well as the appropriate communications hardware and software, are known in the art.

Figure 2:
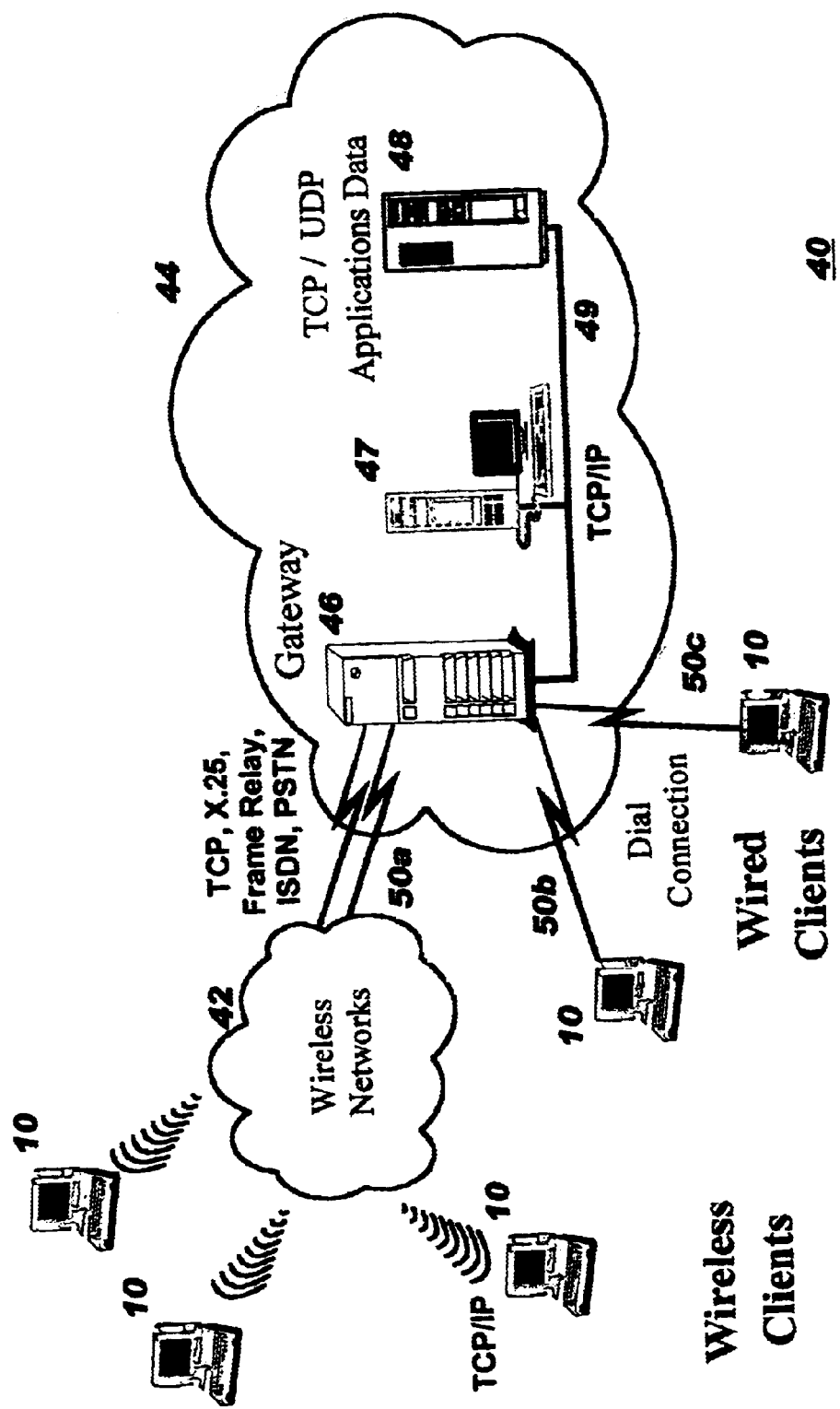
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from IBM, or an Enterprise Systems Architecture/390 computer, etc. Depending on the application, a midrange computer, such as an Application System/400 (also known as an AS/400) may be employed. "Enterprise Systems Architecture/370" is a trademark of IBM; "Enterprise Systems Architecture/390", "Application System/400", and "AS/400" are registered trademarks of IBM.

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 of the workstation 10 and server 47 from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

In the preferred embodiment, the present invention is implemented as a computer software program. This program will be used where message queuing is being used to send messages from a sending application on one computer to a receiving application on a different computer, where the queued messages will be sent over a network connection. Using the present invention, the priority of queued messages can be changed by a request from the sending application or the receiving application (including input from their human users). In the preferred embodiment, the implementation of the logic for changing the priority is integrated with the code of the message queuing system, as one or more modules (also referred to as code subroutines, or "objects" in object-oriented programming) which are invoked during execution of the message queuing process. Alternatively, the logic may be implemented as a separate utility program, which provides services that are accessed by the message queuing process, without deviating from the inventive concepts disclosed herein. Logic supporting creation of the change-priority requests is invoked by the application programs. The implementation of the priority-change logic may execute on a client computer, on a server, or both. The server may be in a corporate intranet or extranet of which the client's workstation is a component. Use of the term "Internet" herein, when discussing processing associated with the user's request, includes processing that occurs in an intranet or extranet, unless otherwise stated. The present invention operates independently of the communications protocol used to send messages between the client and server.

The preferred embodiment of the present invention assumes the availability of a queuing system at both the sending and receiving sides of the network connection, and that a priority is associated with each message that is queued to be sent. It also assumes that large data objects, such as files, may be partitioned into multiple message segments (to be sent as multiple messages), which share the same priority.

In the prior art approach to message queuing, the sending queue and receiving queue are typically implemented as First-In, First-Out (FIFO) queues. With a FIFO implementation, messages are queued for transmission (and subsequently transmitted) in the order in which they are sent to the queuing system by the sending application. On the receiving side, the messages are stored in the queuing system in the order in which they are received from the network, and delivered to the application in this same order. When messages of varying priorities are sent and received, separate FIFO queues may be used for each different priority, with messages waiting in higher-priority queues being serviced before those in lower-priority queues. Or, a single queue may be used which mixes messages of different priority together, where a technique such as using separate head-of-queue pointers and linked lists for each priority enables finding higher-priority messages first—with the result that the queue is not processed in a strictly FIFO manner. However, no techniques are known to the inventors which enable dynamically changing the priority of a message once it has been queued for transmission, and/or once message transmission has begun.

The present invention uses a persistent message store in the sending and receiving queuing systems, which serves a similar function to these prior-art FIFO queues. In the preferred embodiment, messages are stored in the persistent message store in an order that affects the order of their transmission. On the sending side, the transmission is from the sending queue to the network, and on the receiving side, the transmission is from the receiving queue to the receiving application. With the present invention, messages are still transmitted from the head of the sending and receiving queues as in the prior art. However, this invention adds the beneficial capability for individual messages associated with a data object to be located in either queue (or both), and for the delivery order of those messages to be changed to reflect the desired change in priority. To optimize processing of the queues, the messages are not physically moved from one queue location to another in the preferred embodiment when message priority changes. The queues will instead contain pointers to locations in persistent storage where the content of the messages to be delivered is stored, thus enabling the queues to have minimal storage requirements. On the sending side, the sending queue points to message segments to be delivered to the network. On the receiving side, the receiving queue points to message segments to be delivered to the receiving application. (These queues are discussed in more detail below, with reference to FIGS. 3A–3D.) When a priority change is to be made, the order of delivery is changed by relinking the queue elements—that is, changing the logical order of the pointers stored in the affected queue. Techniques for reordering the elements in a queue by changing links are known in the art, and will not be described in detail herein.

Message queues of the prior art include an interface that supports commands such as "queue" and "dequeue", "put" and "get", or other equivalent syntax that conveys a request to put a message into the message queue and retrieve it from the queue, respectively. The present invention adds commands to the message queuing interface that enable sending and receiving applications to modify the priority associated with a selected in-transit data object. The specific number and descriptions of priority levels that may be set using such commands do not form part of the present invention. Assume for purposes of illustration that a set such as "Normal", "Urgent", and "Critical" is used. The sending application will associate a priority with each data object when the data object is initially passed to the queuing system. The receiving application will receive a notification of the arrival of this data object (or one of its segments, when it has been partitioned), which includes a notification of the priority of the arriving object. Using the novel technique of the present invention, the sending and receiving sides can both use commands available in the interface to the message queuing system to identify a data object queued earlier, and request that the priority associated with this data object be changed. For the sending side, the priority change can be requested up until the last message segment for the data object has been sent across the network and delivered to the receiving application. For the receiving side, changes to the transmission priority can generally be requested for any message segments that have not yet been sent across the network and for those that have not been delivered to the receiving application.

Along with the message queuing interface which makes priority change request commands available, means are provided for sending the change request to the partner of the requester. That is, if the receiving side requests a priority change, and that request is allowed, a message will be sent to the queuing mechanism at the sending side to cause it to change the order in which the selected data object will be delivered to the network. When the sending side requests the change, and the request is allowed, a message will be sent to the receiving side to cause it to change the order in which queued messages are delivered to the receiving application.

In a further aspect of the preferred embodiment, requests to change transmission priority may sometimes be denied. This aspect defines a priority change resolution algorithm ("PRA"), whereby requests for different priorities can be resolved. Four basic entities may participate in determining the order in which messages are transferred: (1) local applications; (2) remote applications; (3) the network; and (4) the local device and operating system characteristics. (The manner in which an application considers its device and operating system characteristics in the decision to request a priority change, and/or bases that request on other factors, does not form part of the present invention.) At times, the sending and receiving applications and queuing systems may have different ideas about the appropriate priority for a specific message. The PRA resolves conflicts of this type. This algorithm uses a ranking technique for both the local and remote applications, where the client and server exchange this information at least once, for example at initial connection establishment. Preferably, the rank would be an attribute of the queuing mechanism that is known at system startup. The rank proposals are used by the queuing system when a priority change is requested, to determine whether to allow the change. The rank proposal issued will preferably be one of the following in this aspect of the preferred embodiment: (1) Local Primary; (2) Remote Primary; (3) Sender Primary; (4) Receiver Primary; or (5) Peer. A rank proposal of "local primary" indicates that this side (i.e. the "local" side) wants to have primary control over the outcome of the priority change request, whereas a proposal of "remote primary" indicates that this side will defer to the other (remote) side. "Sender primary" indicates that the side which is sending the messages should have primary control, and "receiver primary" indicates the opposite. A proposal of "peer" is used when the proposer wishes for both sides to have equal say in the outcome, using a tie-breaking approach. The proposal for each side is registered with its queuing system. When a priority change request is received by the queuing system, it will use the proposals from each side to determine one of three outcomes: (1) the local application outranks the remote application; (2) the remote application outranks the local application; or (3) the proposals conflict. In the latter situation, the preferred embodiment treats the local and remote applications as peers. In this case, either the local or remote application can initiate a change which then is in effect as the new priority. The details of the preferred embodiment of this rank resolution technique, and how it is used to resolve the priority outcome, are explained in detail below with reference to FIGS. 11–13.

As stated previously, a number of factors may be used in an implementation-dependent manner to determine whether the priority associated with one or more messages should be changed. An interface may be provided whereby a human user can request that messages from a server be delivered in some different order than the server has queued them for transmission, or request that messages (e.g. e-mail messages) that the user previously queued for sending should be sent in some different order. In addition, the applications running at the client and server may consider a number of system and network factors, along with the needs of the specific application, to determine when to request a priority change. An example of system factors that may influence this decision is the storage capacity available at the device on which the receiving application is executing. If a large data object is to be transmitted to the receiving device at a point in time when it has limited storage, the receiving application may request an increase in priority for other queued messages that will require less storage. By receiving those smaller messages first, the number of messages that the constrained-storage device can receive is increased. An example of network factors that may be considered is fluctuation in network transfer rates. An application may have means for determining that the network has become congested at some point after a large data object has been queued. Rather than wait for all the segments of this large object to arrive under the congested conditions, the sender or the receiver may request that transmission of this object be delayed by changing it to a very low priority. If the object is still queued when the network traffic improves, the priority may then be increased with a subsequent change-priority request. As an example of application factors that may be considered when determining whether to request a priority change, a particular application may be using time-sensitive data. For example, a multimedia application may be playing video that is to be synchronized with a sound track. If the application requires all the data sources to be completely received before beginning, it may calculate that the anticipated delivery completion time for the video segments will be much later than that of the sound segments using the currently-assigned priorities. Assigning a new higher priority for the video segments would allow them to be available sooner, so that the application would be ready for execution sooner.

The preferred embodiment of the present invention will now be discussed in more detail with reference to FIGS. 3 through 13.

Figure 3A:
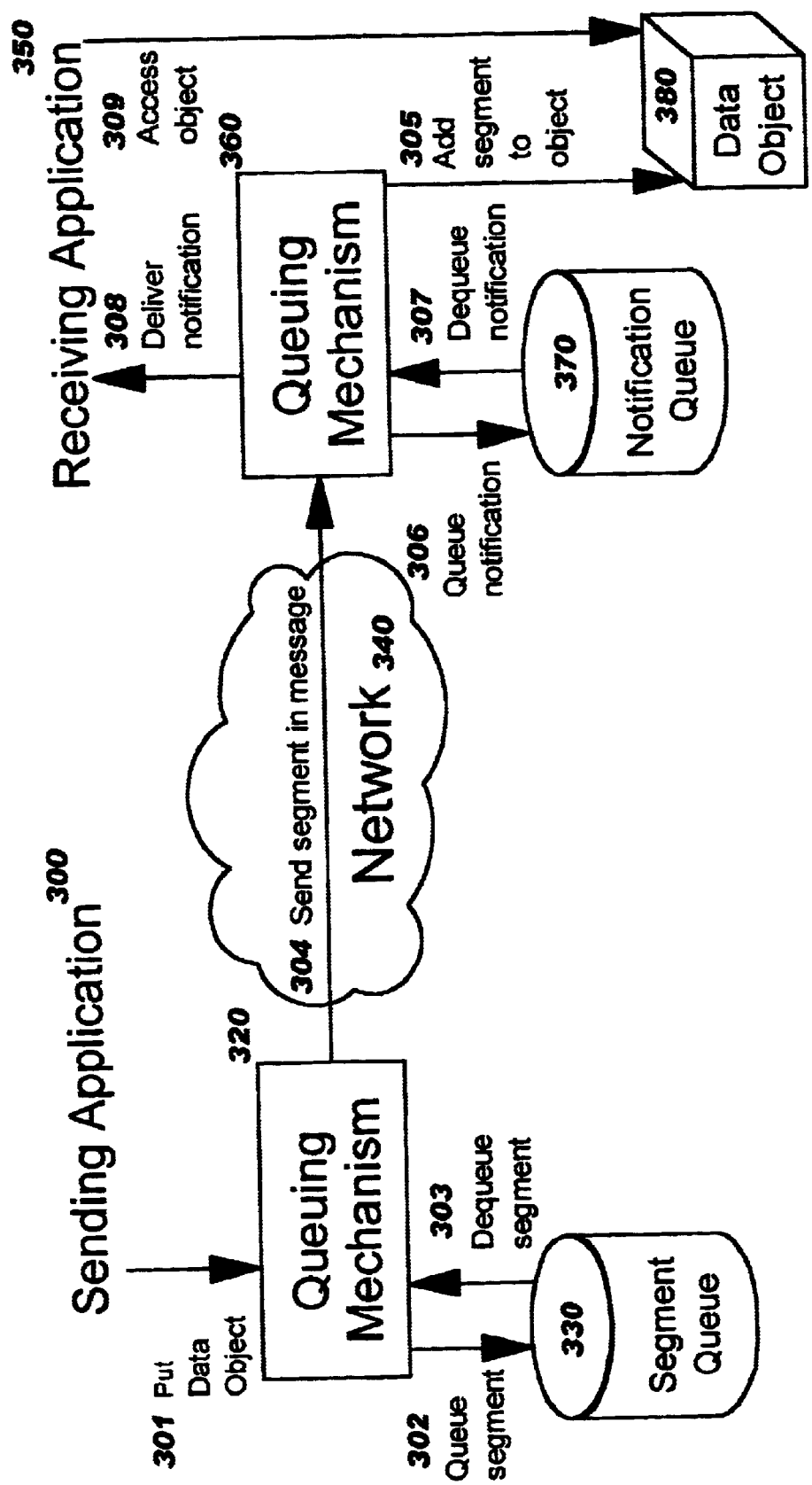
FIGS. 3A–3D illustrate a sending application sending messages to a receiving application, with segments of the messages being stored in message queuing systems of both computers, and how the present invention may be used to reorder the stored messages to reflect dynamic priority changes.

FIGS. 3A–3D illustrate a sending application sending messages to a receiving application, with segments of the messages being stored in message queuing systems of both computers, and how the present invention may be used to reorder the stored messages to reflect dynamic priority changes. FIG. 3A shows the normal data flow, without a priority change. The sending application 300 issues a "Put Data Object" message 301 (or other equivalent "send data" command), which sends a data object from the application 300 to the queuing transport mechanism 320. The queuing mechanism 320 may optionally partition the data object into multiple segments, so that it will be sent in more than one message (for example, to adapt to the requirements of the networking protocol). Each segment (or message, if segmentation did not occur) is then queued for transmission 302 by placing entries in the segment queue 330. (The actual data content of the message segments may be stored separately, outside the queue.) A priority is associated with each message 301, and with each segment of that message. The message is destined for receiving application 350, and will reach that destination by being sent 304 through a network 340 when the queuing mechanism 320 dequeues the message-segment(s) 303. The manner in which the queuing mechanism 320 determines that a message segment should be dequeued 303 for transmission 304 is known in the art, and does not form part of the present invention. When message segments have been queued up while working in disconnected mode, the dequeuing will typically be invoked when the client node establishes a connection to the server. The manner in which the appropriate receiving application 350 is located, the network connection 340 is made, and the request 304 is sent, are well known in the art. A common example of the scenario illustrated in FIG. 3A is a user creating e-mail messages, which are forwarded by the sending e-mail application 300 to a receiving application 350 that is responsible for routing the messages to their intended receivers.

When the message reaches the receiving side of the connection, queuing transport mechanism 360 receives and stores the incoming message. In the preferred embodiment of the present invention, message segments for a partitioned data object are rebuilt by reassembling the segments 305 for the data object 380 in a data repository (such as a file stored on a disk), and a separate notification 306 that the segment has arrived is stored in notification queue 370. This notification will be dequeued 307 by the queuing mechanism 360 at some later point, and delivered 308 to the receiving application 350. The receiving application 350 will then access 309 the data object 380 when required by the needs of the application 350. The present invention assumes that the data objects are delivered to the receiving application in priority order, with higher-priority objects being delivered before lower-priority objects.

Figure 3B:
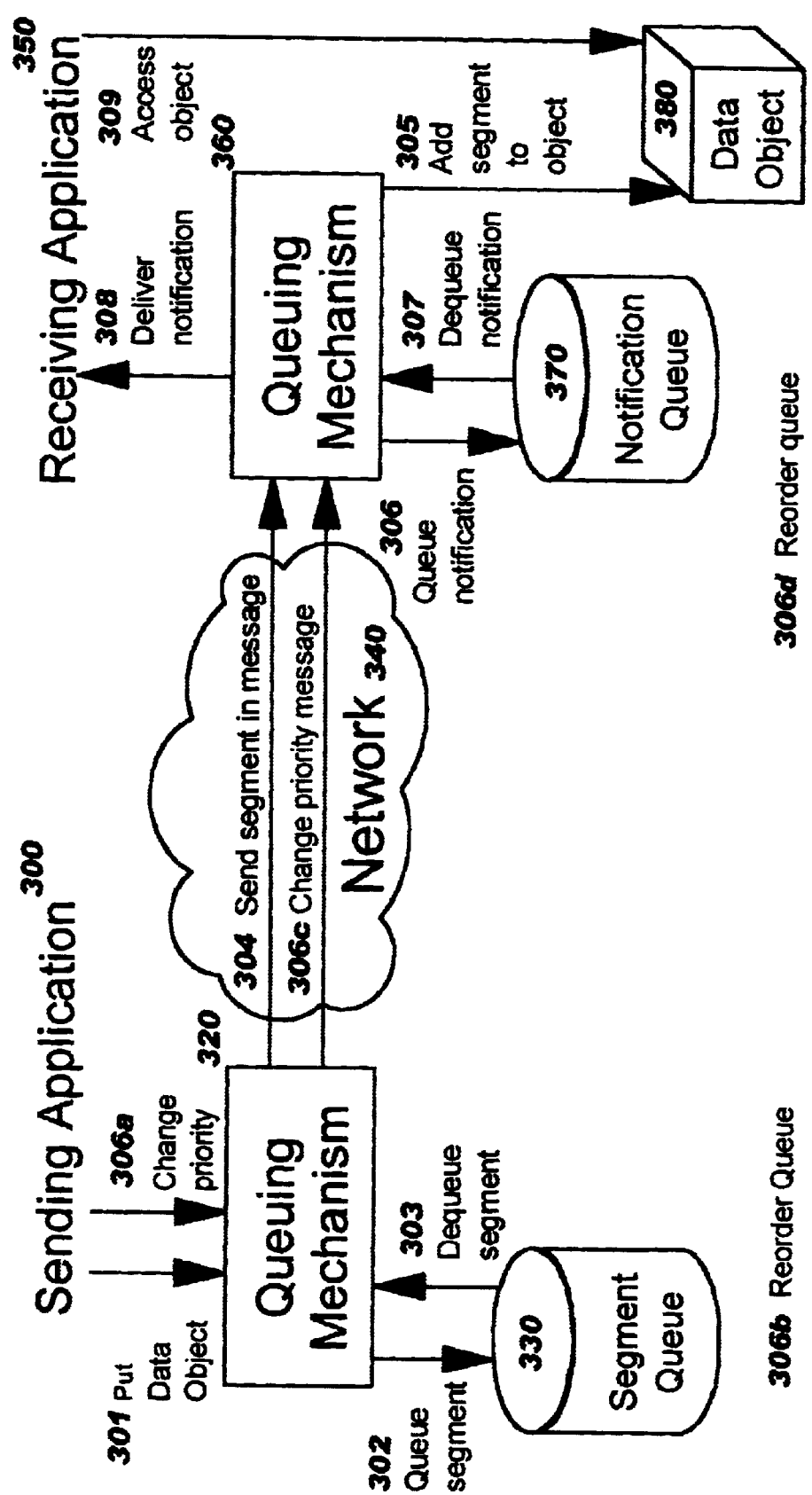
Figure 3C:
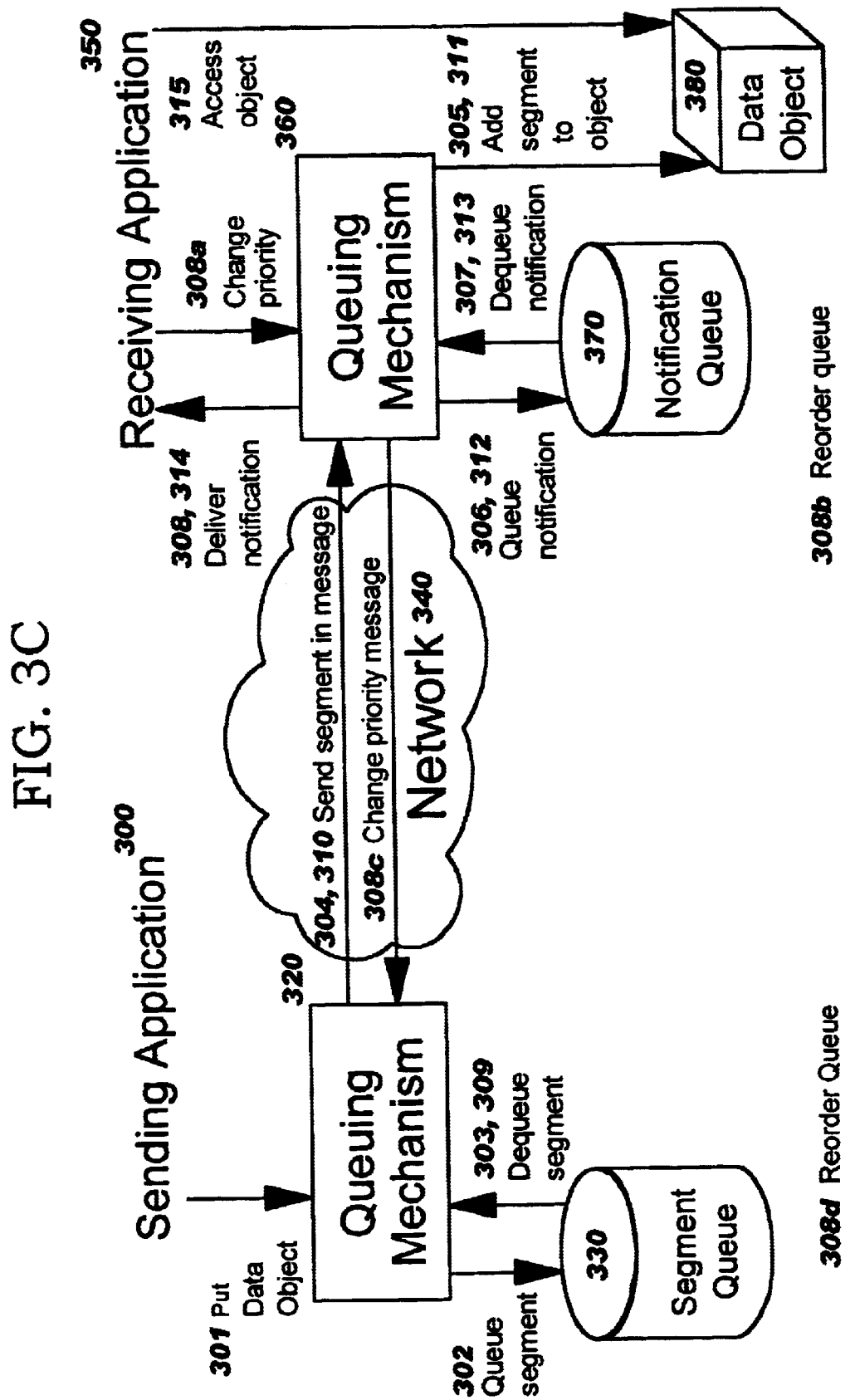
Figure 3D:
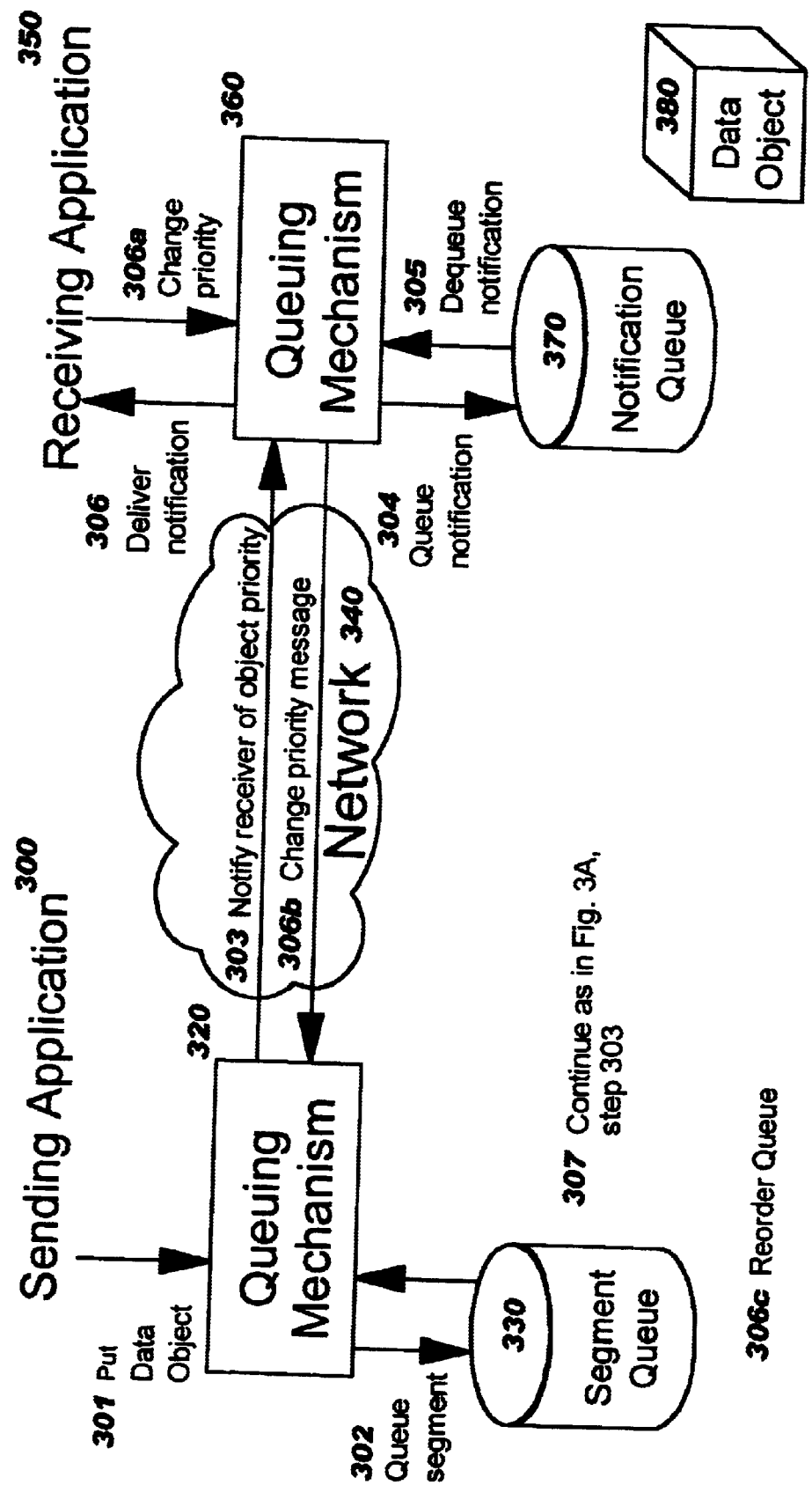

FIGS. 3B and 3C illustrate the message flow used in the present invention as it changes message priorities dynamically for in-transit data objects. FIG. 3D shows the message flow of a further aspect of the present invention, when advance notification of intended message priority is sent to a receiving application. The logic used by the preferred embodiment to implement the priority changes depicted in these flows is shown with flowcharts in FIGS. 4–13, and is discussed below.

In FIG. 3B, the sending side application 300 requests a priority change. The flows 301 through 309 discussed above with reference to FIG. 3A apply here as well. After a data object has been sent to the queuing mechanism 320 (using the put request 301), the sending application 300 determines (using criteria which do not form part of the present invention) that the message segment(s) queued for this data object should be transmitted using a different transmission priority. Typically, the sending application 300 will not know whether the segments of the previously-queued message are still queued completely within the segment queue 330, completely within the receiver's queue (represented by notification queue 370), or have been partially transmitted. The present invention provides the ability to reorder the transmission to the network 340 for those segments still in segment queue 330, and to reorder the transmission to the receiving application 350 for those segments represented in notification queue 370. FIG. 3B illustrates this capability with flows 306a through 306d. The flows are so numbered to emphasize that they may begin after one or more segments of this data object have already been queued at 306 on the notification queue 370; however, the flows 306a through 306d may occur at any time following the put request 301 for the corresponding data object. The sending application 300 requests a change to the priority for the selected data object by issuing change priority request 306a. The queuing mechanism 320 on the sender's side then reorders 306b its segment queue 330 accordingly, and sends a change priority message 306c to the receiver side. Upon receiving that message, queuing mechanism 360 reorders 306d its notification queue 370. As the queuing mechanism 360 dequeues the reordered message notifications 307, the corresponding data objects 380 will be made available for accessing 309 in the revised delivery order requested by the change priority message 306c (assuming, of course, that the change priority message 306c arrives before the notification for the corresponding object has already been dequeued).

In FIG. 3C, the receiving side requests a priority change. The flows 301 through 308 discussed above with reference to FIG. 3A apply here. After the receiving application 350 has received notification 308 of the arrival of a data object, that application determines (again, using criteria which do not form part of the present invention) that it prefers this data object to be delivered using a different transmission priority. As with a change requested by the sending side, the receiving application may not know whether the remaining message segments for this data object are currently being transmitted, whether there are segments still stored in the segment queue 330, or whether all segments are represented by entries in the notification queue 370. Accordingly, the present invention provides the ability for the receiver to request reordering the transmission to the network 340 for those segments still in segment queue 330, and reordering the transmission to the receiving application 350 for those segments represented in notification queue 370. In FIG. 3C, this capability is illustrated with flows 308a through 308d. The flows are so numbered to emphasize that they may begin after notification of this message's arrival has been delivered 308 to receiving application 350. The receiving application 350 requests a change to the priority for the selected data object by issuing change priority request 308a. The queuing mechanism 360 on the receiver's side then reorders 308b its notification queue 370 accordingly, and sends a change priority message 308c to the sender side. Upon receiving that message, queuing mechanism 320 reorders 308d its segment queue 330. As the queuing mechanism 320 then dequeues 309 the reordered message segments for delivery to the network, they will be dequeued in the revised delivery order requested by the change priority message 308c (assuming, as with the sending side flows, that the change priority message 308c arrives before all the message segments have been dequeued 309 and sent 310). Flows 309 through 314 correspond to flows 303 through 308, showing that the delivery path taken by the reordered message segments is the same as the path taken by any other message. Once reassembled, the data object 380 can be accessed 315 by the receiving application 350.

FIG. 3D shows the message flows used when advance notification of intended message priority is sent to a receiving application, and that receiver requests delivery using a different priority. After the data object has been delivered 301 to the queueing mechanism 320, and queued as segments 302 in the segment queue 330, a message 303 is sent to the receiving application 350 which notifies the receiver of the object's priority. This notification message 303 is queued 304 on the notification queue 370, and dequeued 305 for delivery 306 to the application 350. The application may then consider whether the currently-assigned priority will result in the data object 380 being delivered in a timely manner according to this application's needs. If not, the application 350 issues a change priority request 306a, which is communicated back to the sending side as change priority message 306b, causing reordering 306c of the message segments in segment queue 330. Note that FIG. 3D does not show any segments of data object 380 having been received at the receiver side, nor any segments accessed by the receiving application 350, because this notification message 303 is intended to precede delivery of the actual segments of the data object.

Figure 4:
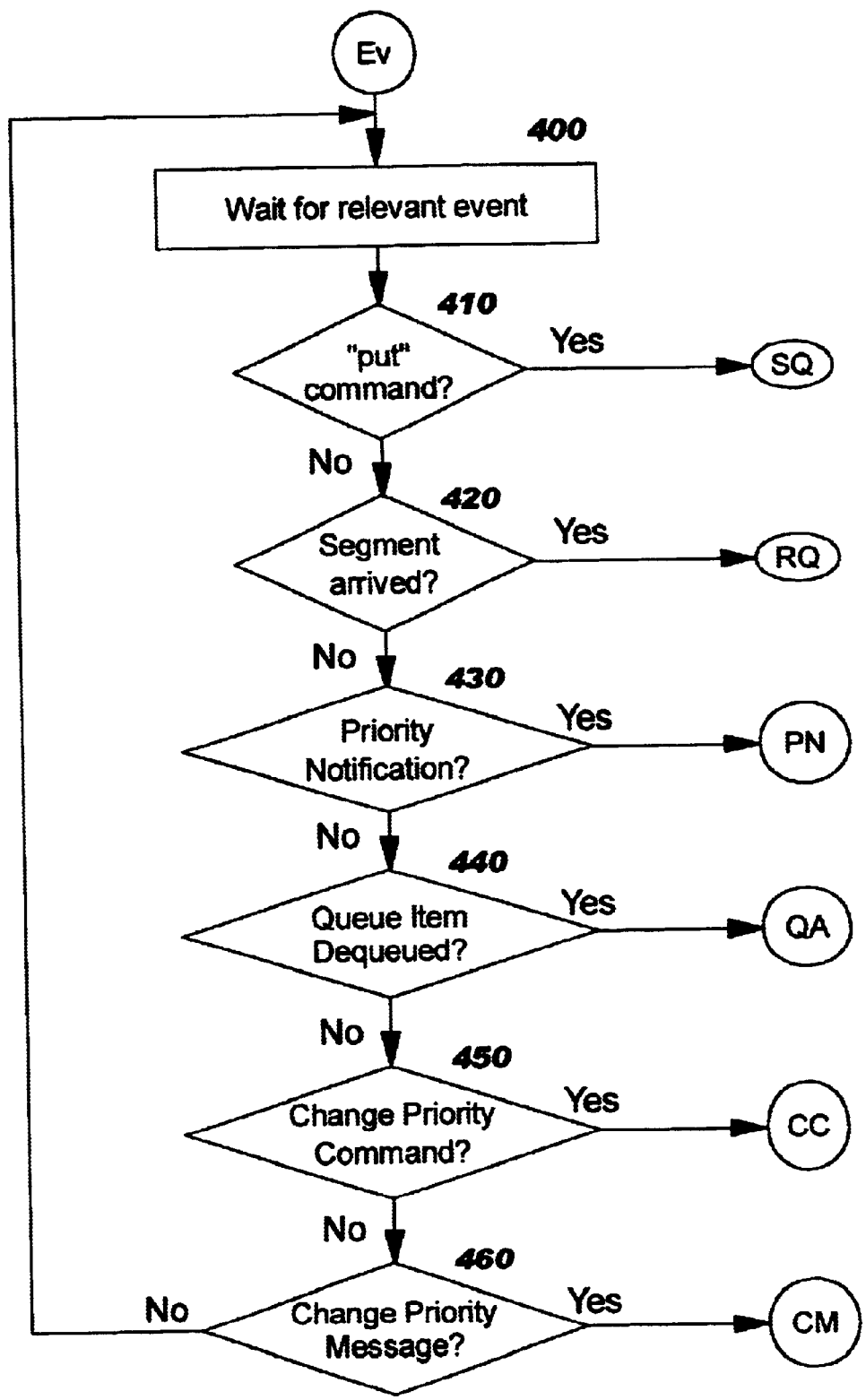

FIG. 4 depicts, at a high level, the logic used in the message queuing systems of the sending and receiving implementations of the present invention to monitor and process the events being received. The process begins at Block 400, where the implementation waits for some relevant event. If a "put" command is received for sending data, Block 410 detects this command and transfers control to the segment-queuing process depicted in FIG. 5. Block 420 detects arrival of a message segment at a receiver, and transfers control to the receive processing in FIG. 6. If a priority notification message is received, Block 430 detects this event and transfers control to the logic shown in FIG. 7. Block 440 detects that a dequeue event occurs at either the sender or receiver, and handles this event by transferring control to the dequeuing process depicted in FIG. 8. Block 450 detects that a change priority request has been received from the local application, and Block 460 detects a change priority message, which originated from the remote application. These events are processed using the logic of FIGS. 9 and 10, respectively. Other events may be received by the queuing system which are not pertinent to the priority-change technique of the present invention, and thus are not shown in FIG. 4. Logic to account for these additional events may be added to the process depicted in FIG. 4 using techniques which are well known in the art.

Figure 5:
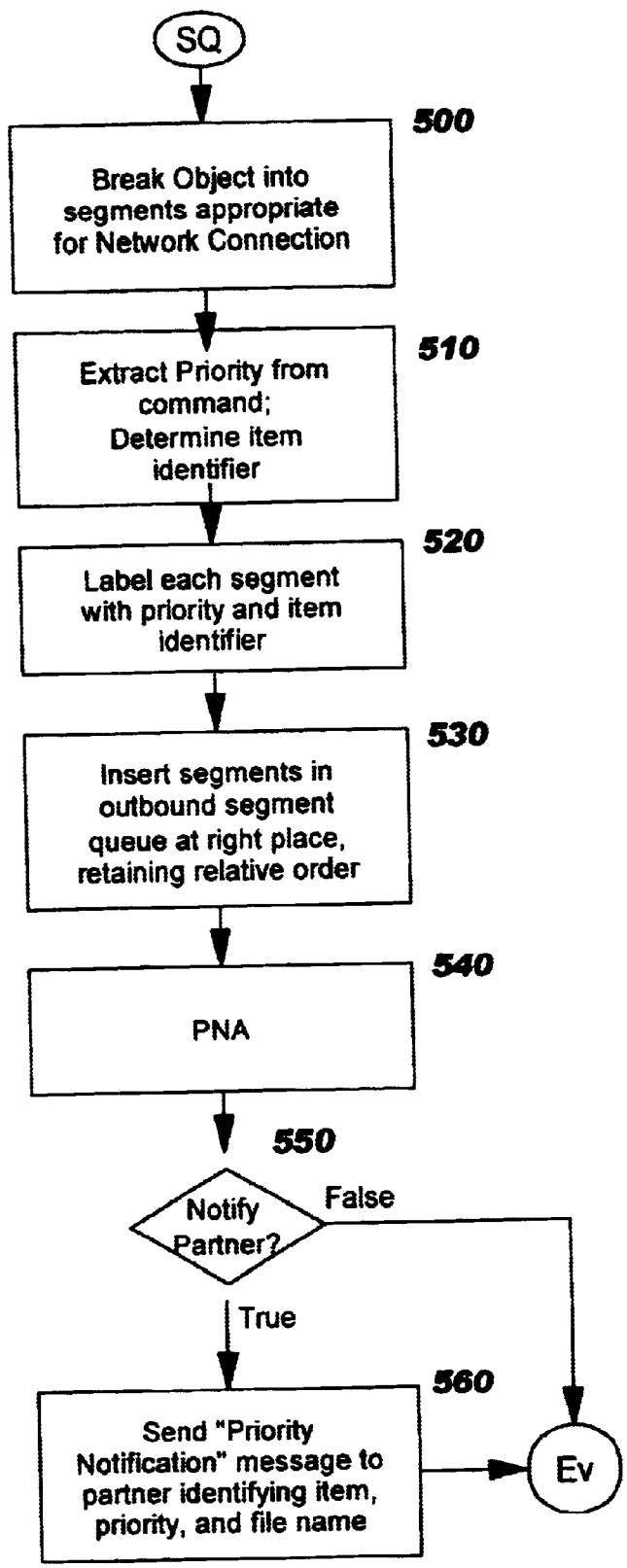

The process with which message segments for a data object are entered into the segment queue 330 is shown in FIG. 5. The object is partitioned into segments appropriate for the network connection at Block 500, which may include no partitioning. Block 510 extracts the assigned message priority that was sent (e.g. as a parameter) on the put command, and determines an item identifier for the data object. Alternatively, the application may assign the item identifier and pass it into the queuing mechanism as an input parameter. Each segment of the data object is then labelled with the object's priority and identifier at Block 520, to enable all the segments of the object to be reassembled on the receiving side. Block 530 inserts a pointer for each segment into the outbound segment queue 330 at the right place according to the data object's assigned transmission priority, retaining the relative order of the segments.

A number of alternative techniques for placing an item into a queue using priority order will be apparent to one of ordinary skill in the art. For example, the queue elements could be physically ordered by decreasing priority, so that processing each queue entry in order would lead to the desired result of accessing all high-priority entries before any lower-priority entries. However, because of the high overhead costs that would be incurred with moving queue elements when the priority-change techniques of the present invention are used, the preferred embodiment uses a separate queue for each priority that may be assigned, and Block 530 inserts new elements on the end of the appropriate queue (i.e. the queue for the current priority) by linking this new entry (or these new entries, when multiple segments were created) so that it follows the element which was previously at the end of the queue. In this manner, all messages assigned a particular transmission priority by the sending application are transmitted in the order in which they were queued (in the absence of changes to the transmission order).

Block 540 invokes the processing of FIG. 11, which is a priority notification algorithm ("PNA") that determines whether the partner application (in this case, the receiver) should be notified in advance regarding this message and its priority. The PNA applies a Rank Resolution Algorithm ("RRA") to determine whether the receiver would be able to successfully change the message priority, using the rank proposals exchanged at connection establishment. The PNA returns a negative result when the receiver cannot change the priority, and a positive result when a change priority request by the receiver would be allowed. Use of this algorithm in the "put" processing of FIG. 5 is optional, and when it is not used—as well as when it returns a negative response—the flow of FIG. 5 ends by transferring control back to FIG. 4. When the PNA returns a positive response, Block 560 sends a "priority notification" message through the network to the receiver, to notify it in advance of the priority that will be used to deliver this data object. The priority notification message includes as parameters the item identifier, item priority, and optionally a file name to be used for storing the data object. (This message will be detected at Block 430 of the receiving implementation, and processed according to the logic of FIG. 7.) After sending the message in Block 560, control returns to FIG. 4.

Figure 6:
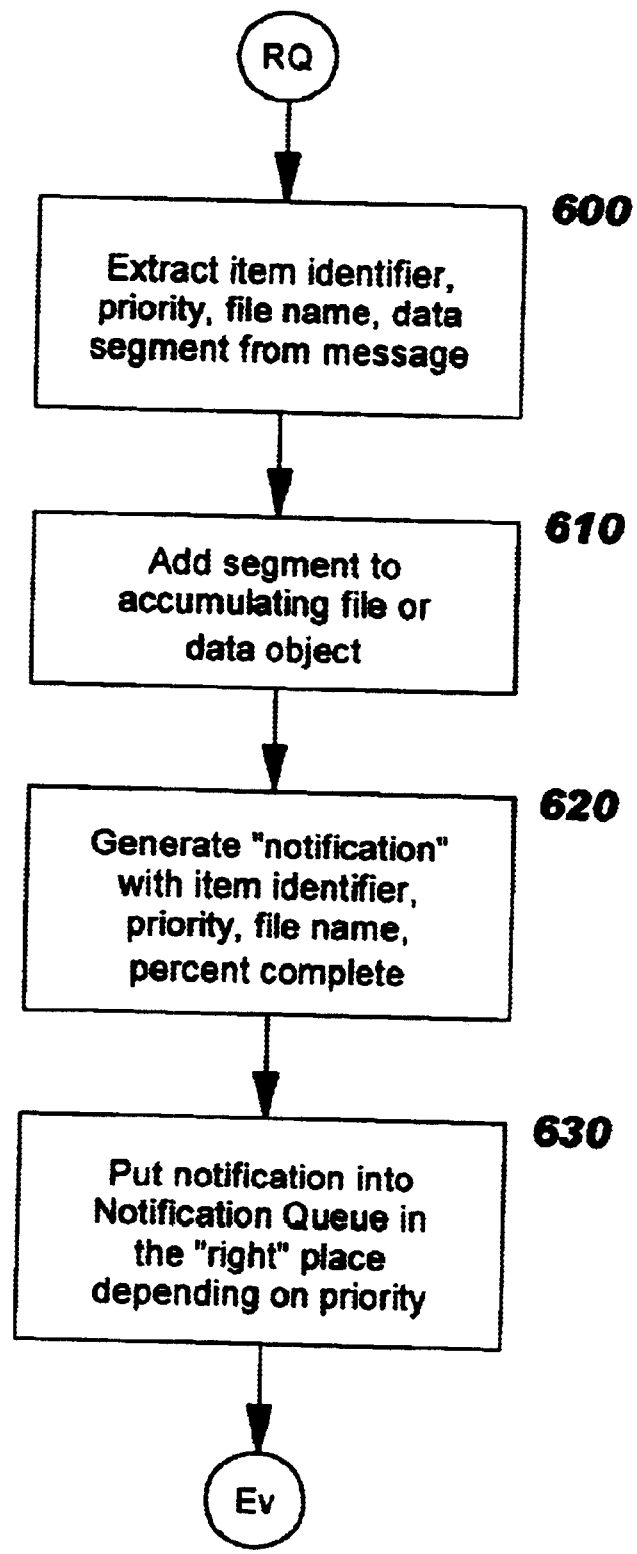

FIG. 6 depicts the logic used to process arrival of a message segment from the network 340 at a receiving queue mechanism 360. The item identifier and priority, as well as the data content of this segment, are extracted from the message by Block 600. Optionally, a destination file name may have been specified by the sending application. In that case, the file name is also extracted from this message; otherwise, a file name for storing the data object will be assigned at the receiving side. Block 610 stores the data content into an accumulating file or data object, using the requested or assigned file name, in order to reassemble the segments of the object. Preferably, the reassembling process will use a data repository such as a file on a disk drive accessible by the receiving application. However, if the receiving application is executing on a device which does not have disk storage (such as a handheld computer), then the data object may be stored and reassembled in the random-access memory of the device. Block 620 generates the information to be stored on the notification queue 370 for this message segment, from received parameters which specify the item identifier and priority, and optionally a "percent complete" indication, and the file name in which the object is being stored. The percentage information is useful for notifying the receiver how much of the data object has already been received, and is available when the sender includes overall data object size as part of the information sent in the message segments. Block 630 puts this notification information into the notification queue 370, in the right place for a message having this priority. After Block 630 completes, control returns to the processing of FIG. 4.

Figure 7:
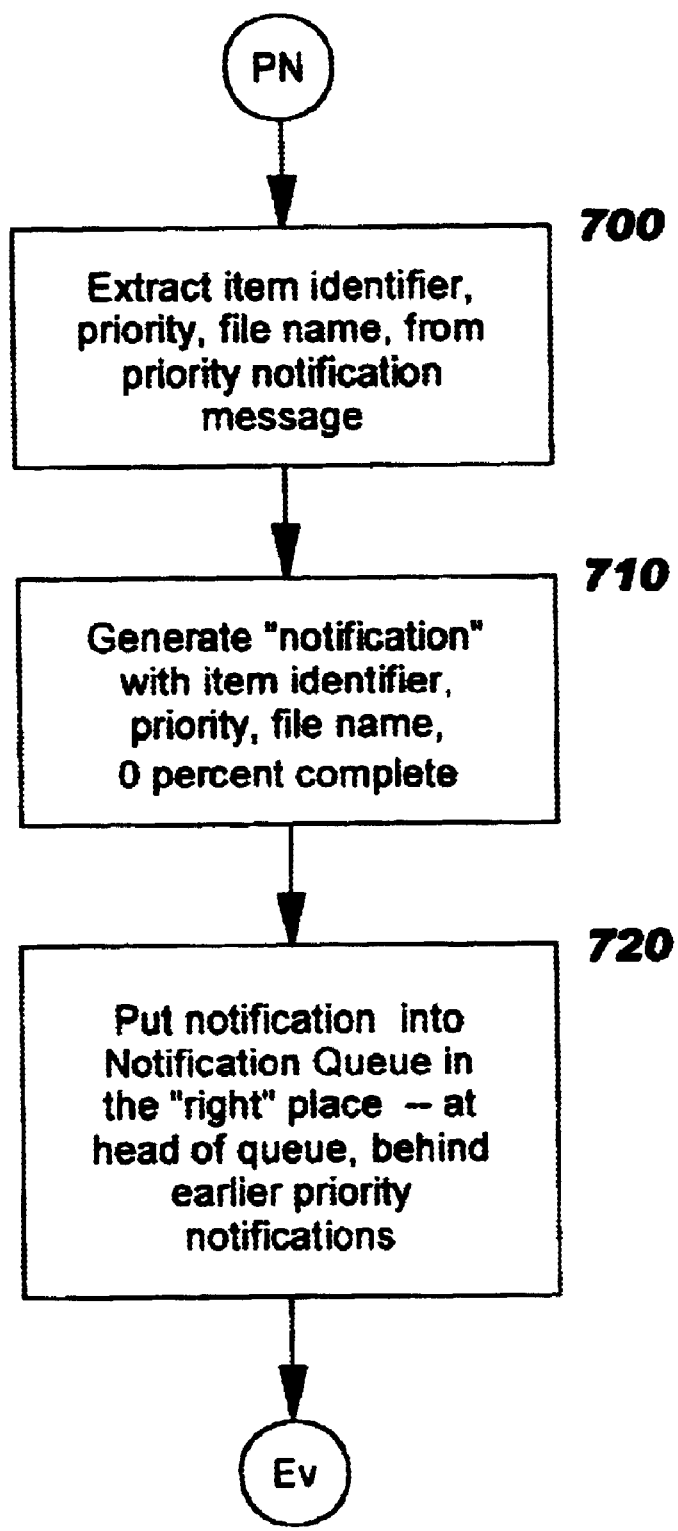

The logic with which a priority notification message is processed by the queuing mechanism 360 is shown in FIG. 7. As stated previously, this message is an optional enhancement of the preferred embodiment, and is used to provide advance notification of the priority that a sender will use for a data object. When the receiving application 350 receives this advance notification, it can determine whether to request a change to the sender's priority. Block 700 extracts the item identifier and intended priority from the priority notification message, as well as a destination file name that may have been specified by the sender. Block 710 uses this information to create a notification entry that will be placed on the notification queue 370. Since no data for the object has actually been received, "0 percent complete" is used for the completion status in the notification entry. Block 720 places this entry at the right place in the notification queue 370, which, according to the preferred embodiment, comprises placing the entry at the head of the queue for messages of the highest priority. This enables the advance notification to be delivered to the receiving application 350 right away (i.e. as the next-delivered item), so that the application can quickly respond if it wishes to request a priority change. Alternatively, the entry could be placed at the head of the queue for messages of the corresponding priority, so that it would be processed after all higher-priority messages but before messages that contained data and had the same priority as the notification message. Once the entry has been placed in the queue, control returns to FIG. 4 to await arrival of the next relevant event.

Figure 8:
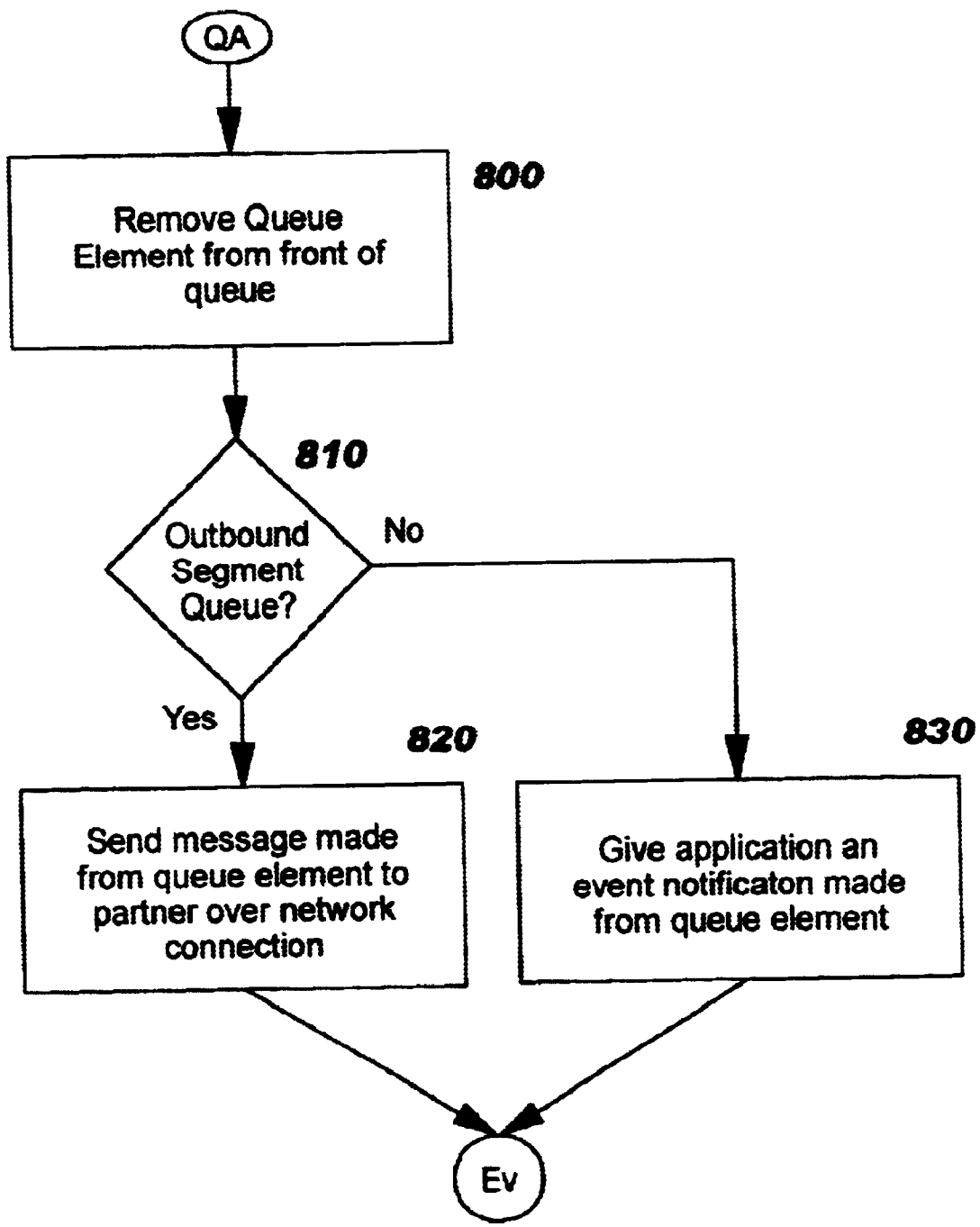

Processing of a dequeue event that occurs at either the sending or receiving queue mechanism (320 or 360) is performed according to FIG. 8. Generation of such events is under control of the queueing mechanism, and the manner in which the mechanism determines the need to dequeue a queue entry does not form part of the present invention. Block 800 removes the queued entry from the head, or front, of the appropriate queue (that is, the segment queue 330 when executing on the sending side, and the notification queue 370 when executing on the receiving side). When a separate queue is used for each priority, this comprises determining the highest-priority queue that has entries, and removing the first logical entry from that queue. Block 810 asks whether the queue was an outbound segment queue 330. If so, Block 820 makes a message from that queue element and sends it to the partner 360 over the network connection 340. Making a message from a queue element in this context comprises adding information required to transmit the data, such as headers and trailers that may be required by the communications protocol being used for the network connection. Such techniques are well known in the art. If the query at Block 810 has a negative response, then the queue was a notification queue 370, and Block 830 delivers an event made from the dequeued element to the receiving application 350. Here, making an event from the queue element comprises stripping off any data that is not relevant to the application (such as the transmission headers and footers), and adding any additional data or reformatting the data, as required to present a usable event to the receiving application 350. The techniques with which this is done are implementation-dependent, and do not form part of the present invention. Control then returns to FIG. 4.

Figure 9:
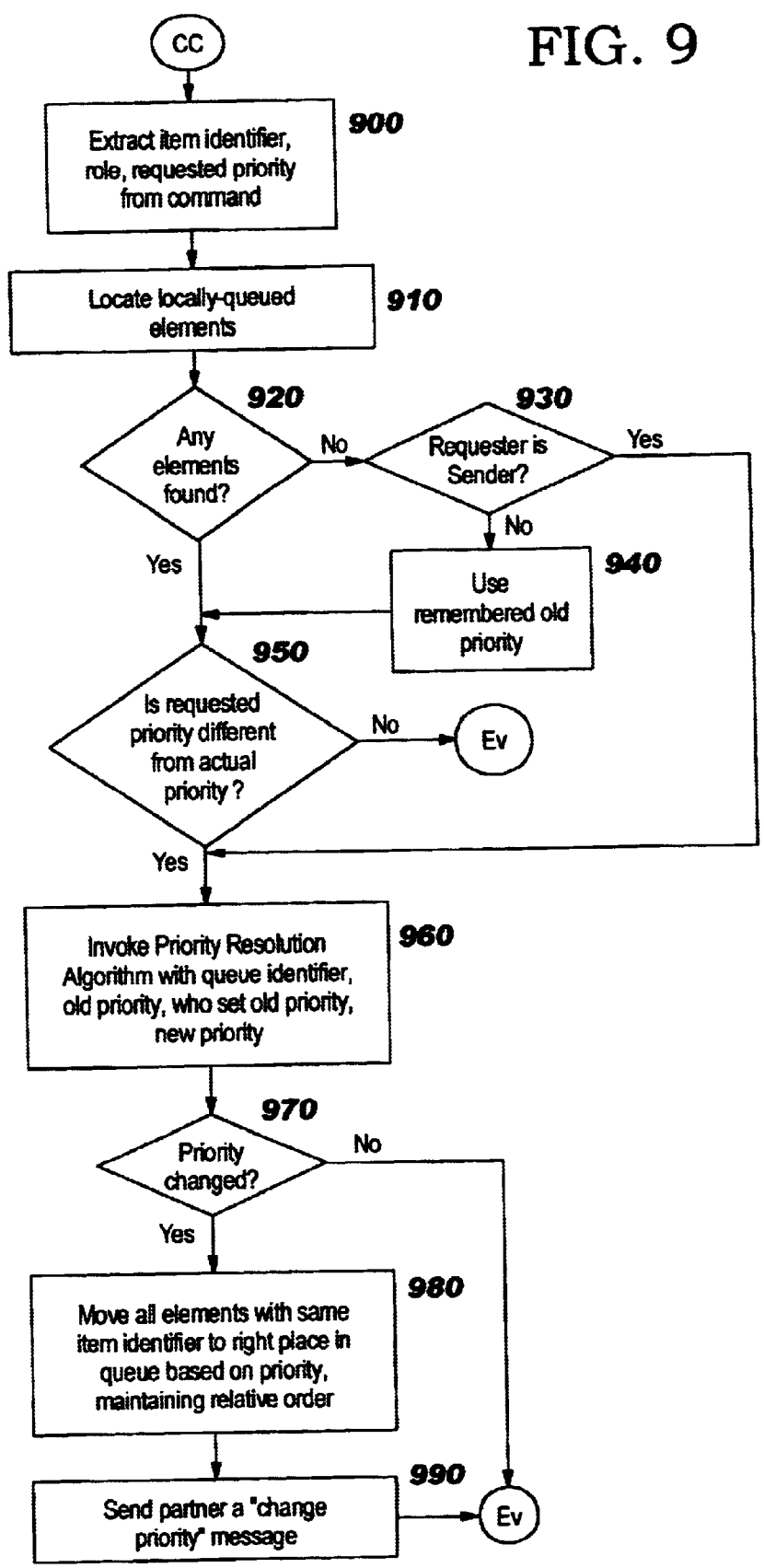

The logic depicted in FIG. 9 is invoked when the local application issues a request to change the priority of a message, such as change priority requests 306*a* (in FIGS. 3B and 3D) and 308*a* (in FIG. 3C). As previously discussed, the change priority request may come from the sending application 300 or the receiving application 350 (including human users of those applications); it may affect elements queued on either or both sides of the network connection; and a priority resolution algorithm ("PRA") is preferably used to resolve conflicts in priority, which may result in some change requests being denied.

Block 900 extracts the item identifier and role, as well as the old priority and requested new priority, from the input command. Because each side may have the capability to function as a receiver and as a sender at different times during execution of the application, there will typically be a segment queue and a notification queue on each side of the connection. The local application preferably specifies the role it played for the message(s) for which it now wishes to change priority, using a "role" parameter on the change priority command, to enable easily identifying which queue is to be affected. Other techniques for determining role could be used equivalently without deviating from the inventive concepts of the present invention, such as searching both queue types to determine where items having this identifier are stored; using two different commands (one to request changing the segment queue, and the other to request changing the notification queue); etc. The existing ("old") priority for already-queued messages is passed as an input parameter of this command if it is known to the invoking application. Otherwise, a special value (such as −1 or a null value) is passed to signify that the old priority is not known.

Block 910 locates the already-queued messages from the queue for the specified role, using the item identifier. When separate queues are used for each priority, the priority specified as the old priority on the input command will be used (if available) to localize the search to the queue for that specific priority; otherwise (if the old priority is not available), all the queues for the specified role will preferably be searched in decreasing order of priority. However, other search orders may also be used.

Block 920 asks whether the search of Block 910 located any locally-queued elements. If none are found (e.g. all the messages may have already been dequeued), Block 930 then asks whether the local application requested the priority change in its role of Sender. If so, then control transfers to Block 960.

When Block 930 has a negative response, then it can be presumed that the local application based its decision to request a priority change on an advance notification it received (because it does not yet have any actual messages for this data object, from which it could have learned the existing priority). Block 940 indicates that the old priority will be set to the value the receiver has previously learned and saved (e.g. from the Priority Notification message).

Following Block 940, and following a positive response to the query in Block 920, Block 950 checks to see if the requested priority is different from the existing priority. When this test has a negative response, nothing would be accomplished by executing the change process, so control returns to FIG. 4. Otherwise, Block 960 of the preferred embodiment continues the change process by invoking a Priority Resolution Algorithm ("PRA") to determine whether the priority should be changed. FIG. 12 depicts a novel example of such an algorithm, which is invoked using four parameters: queue identifier, old priority, who set the old priority, and new priority. How those parameters are used in determining whether to allow or deny the priority change request is discussed with reference to FIG. 12 below.

Block 970 checks the outcome of the priority resolution algorithm. If the change request was denied, control returns to FIG. 4. Otherwise, Blocks 980 and 990 implement the priority change. Block 980 moves all the queued elements having this item identifier in the local queue, maintaining their relative order, so that they will now be located in the right place to cause delivery according to the new priority. As stated previously, the preferred embodiment does not physically move the queued elements, but moves them logically. This logical move occurs by relinking the elements into the appropriate queue for the new priority when a structure such as a linked list is being used to maintain the order of the queue elements. The relinking can be accomplished as a simple append to the existing linked list or by a more elaborate scheme that involves interleaving of elements based on the time of their original placement into the queuing mechanism. Other techniques may be used for specifying queue order, such as a transmission index that specifies an ordered sequence of elements to be transmitted, in which case an appropriate change to the delivery order is made by modifications tailored to the specific queue-ordering technique. Many techniques to manipulate and maintain linked lists are well known in the art, and will not be described in detail herein.

The requested new priority may have been specified as an absolute priority value, or as a relative priority value change. When a relative priority change is requested (for example, a "+2" value that indicates a request to increase the priority by two levels), then the old priority value is used along with this relative value to determine which queue the elements are to move into. If elements were located in Block 920, then the old priority from the located elements can be used in computing the new priority. When elements were not located, the remembered priority from Block 940 will be used if the requester is a Receiver; for a Sender, the old priority must have been passed as an input parameter in order to use relative priorities. If priority queues are identified by non-numeric identifiers, such as "Urgent" and "Normal", then the implementation must include an indication of the relationship between the queues in order to enable use of relative priorities. For example, a table could be used that identified the "Urgent" queue as being 1 priority level higher than the "Normal" queue (a priority change of +1); the "Critical" queue as being 2 priority levels higher than "Normal" and 1 priority level higher than "Urgent"; etc.

Figure 10:
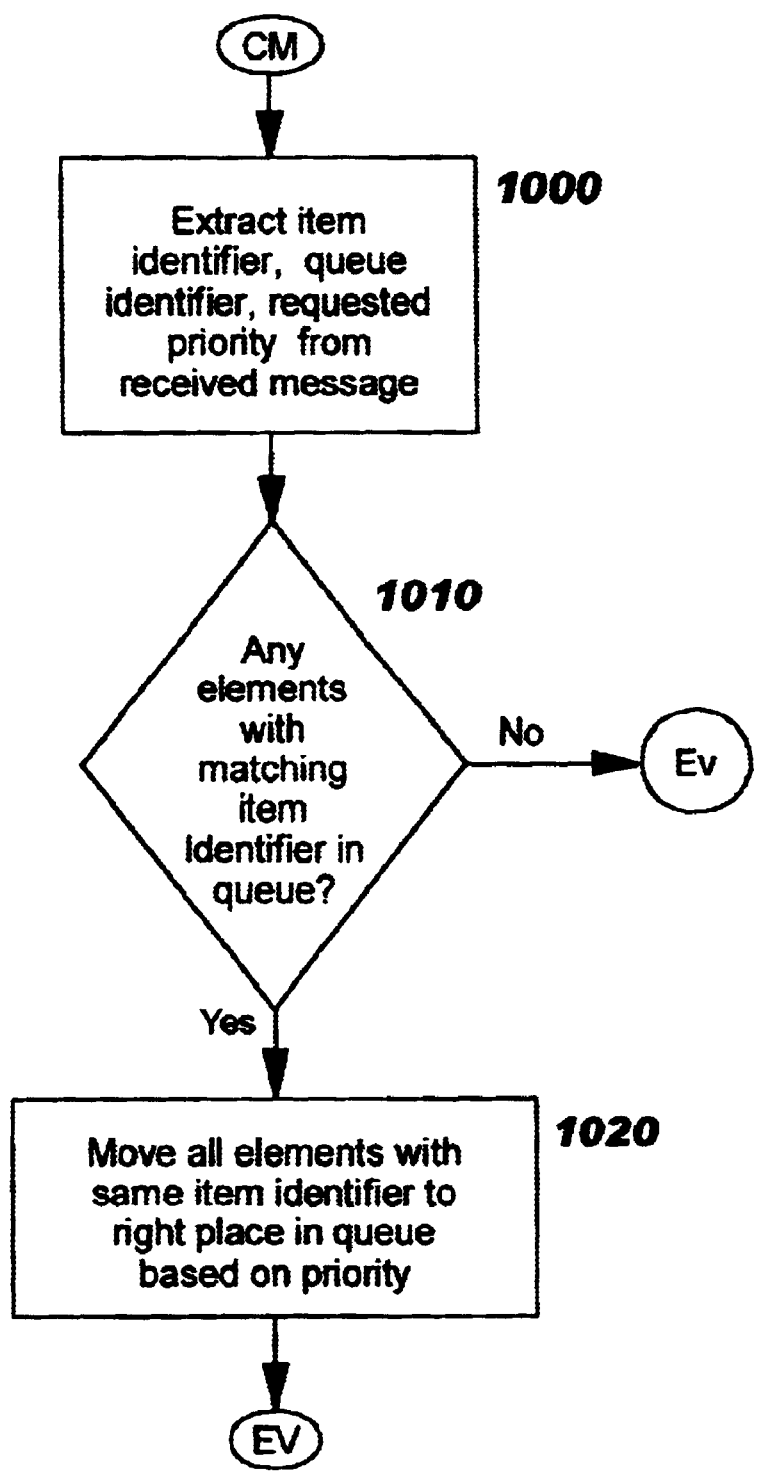

After Block 980 completes the reordering of the locally-queued elements, Block 990 sends a "change priority" message to the partner which will be processed according to FIG. 10. Control then returns to FIG. 4.

The logic depicted in FIG. 10 is invoked when a "change priority" message is received. This message indicates that the partner has requested a priority change, performed a priority resolution algorithm, and the outcome of that algorithm indicates that the change is approved. Such messages are depicted as 306c in FIG. 3B, 308c in FIG. 3C, and 306b in FIG. 3D. At Block 1000, the item identifier and queue identifier, as well as the requested new priority, are extracted from the input message. Here, the queue identifier will be "segment queue" (or other indication of the sending queue) or "notification queue" (or other indication of the receiving queue), and will indicate in which queue the items should be stored. Block 1010 then asks whether any elements with a matching item identifier are stored in the identified queue. If not, control returns to FIG. 4; otherwise, Block 1020 moves all the queued elements having this item identifier in the local queue, maintaining their relative order, so that they will now be located in the right place to cause delivery according to the new priority. As discussed with reference to Block 980 of FIG. 9, the elements are logically but not physically moved in the preferred embodiment. After the queue reordering is complete, control returns to FIG. 4 to await the next relevant event.

The logic of FIG. 11 depicts the Priority Notification Algorithm that is invoked from Block 540 of FIG. 5 as part of the "put" command processing at the sender side of the connection. The process begins at Block 1100, indicating that an input parameter specifies the local context. The local context will be either "sender" or "receiver", according to the role in which the priority change is being requested. Block 1110 invokes the Rank Resolution Algorithm, shown in FIG. 13, using these parameters. The RRA will return a value of "local", "remote", or "peer". When "local" is returned, Block 1120 returns "False" as the outcome of the PNA, indicating that the partner does not have the power to change the priority, and therefore does not need to be notified; otherwise, Block 1130 returns the value "True".

FIG. 12 depicts the Priority Resolution Algorithm ("PRA") used by the preferred embodiment to resolve priority conflicts when a change priority command is received (which is invoked from Block 960 of FIG. 9). Block 1200 indicates the four input parameters that are used, which are old priority, old priority assignee context, new priority, and local context. (Note, however, that the value of the old priority may be a special value when passed to the PRA. This will be the case when an application requested a priority change, but the existing priority was not available, as discussed above with reference to FIG. 9.) Block 1210 tests the assignee context to see if the old priority was set by the local application. If so, then Block 1240 returns the new priority as the outcome of the PRA (using the rationale that the local application is requesting to override its prior setting, and thus the change is accepted). When the old priority was set by the remote application, control will transfer from Block 1210 to Block 1220, and invoke the RRA of FIG. 13. If the RRA returns a value of "remote", then the local application's request to change the priority is outranked by the existing priority set by the remote application, and the outcome of the RRA at Block 1230 is to return the value of the old (existing) priority that was passed to this process as an input parameter. If the RRA returns a value of "local" or "peer", then the local application's request to change the priority will be allowed, and the new priority is returned at Block 1240.

FIGS. 13A through 13E define a Rank Resolution Algorithm ("RRA") used by the preferred embodiment to resolve potential conflicts in rank, to determine whose priority setting (that proposed by the local application or the remote application) will control. The algorithm begins at Block 1300, which indicates that the local context (i.e. whether the application executing the algorithm is acting as a sender, or as a receiver) is used as an input parameter.

If the rank proposal of the local application ("RP1") was that the local application should be primary ("LP"), represented by Block 1302, and the rank proposal of the remote application ("RP2") was that the remote application should be primary ("RP"), represented by Block 1304, then the parties are in agreement and Block 1306 returns an indication that the local side wins the ranking algorithm. When the RP1 value is "LP" and the RP2 value is other than "RP", the resolution is completed according to the logic of FIG. 13B.

Figure 13A:
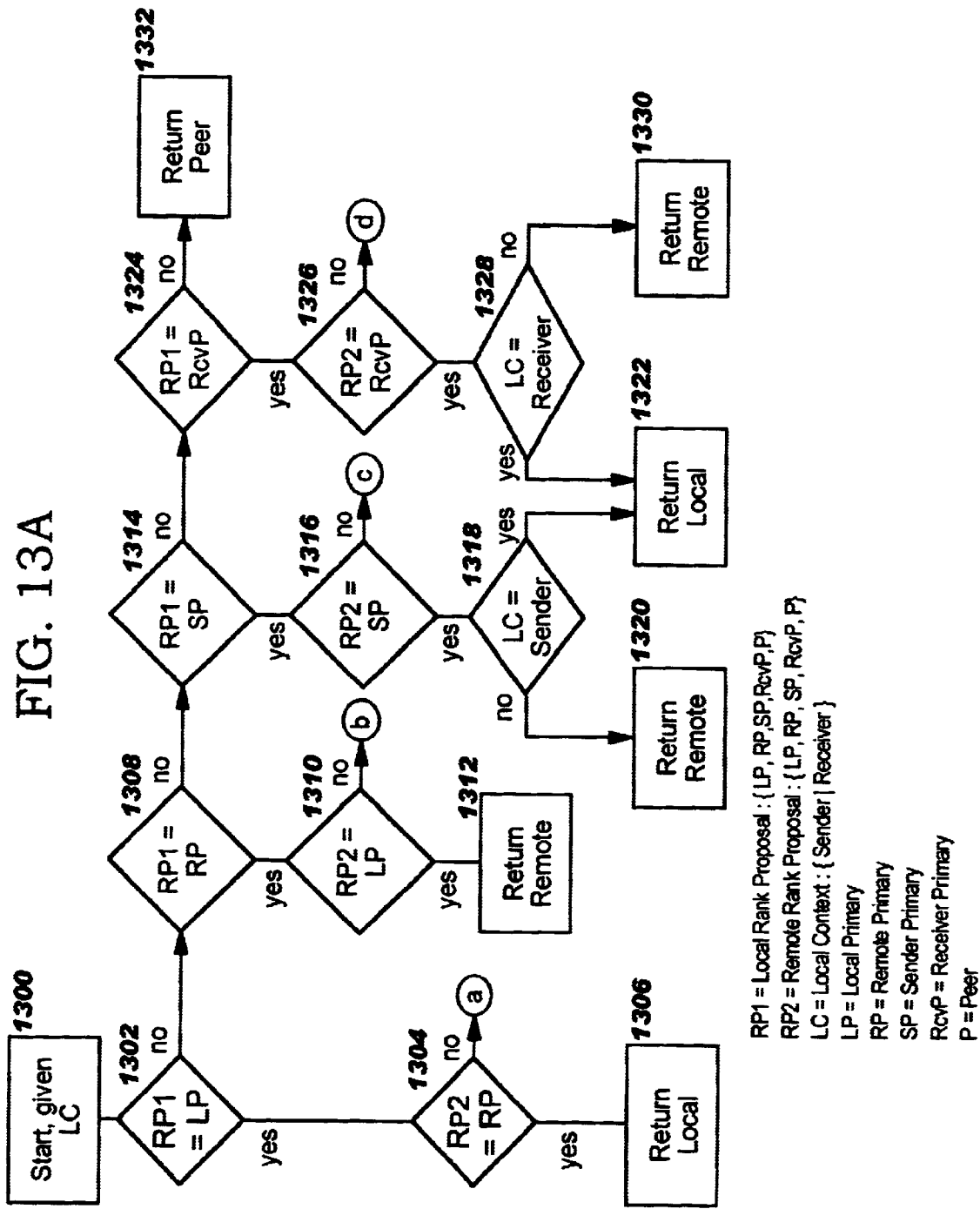
Figure 13B:
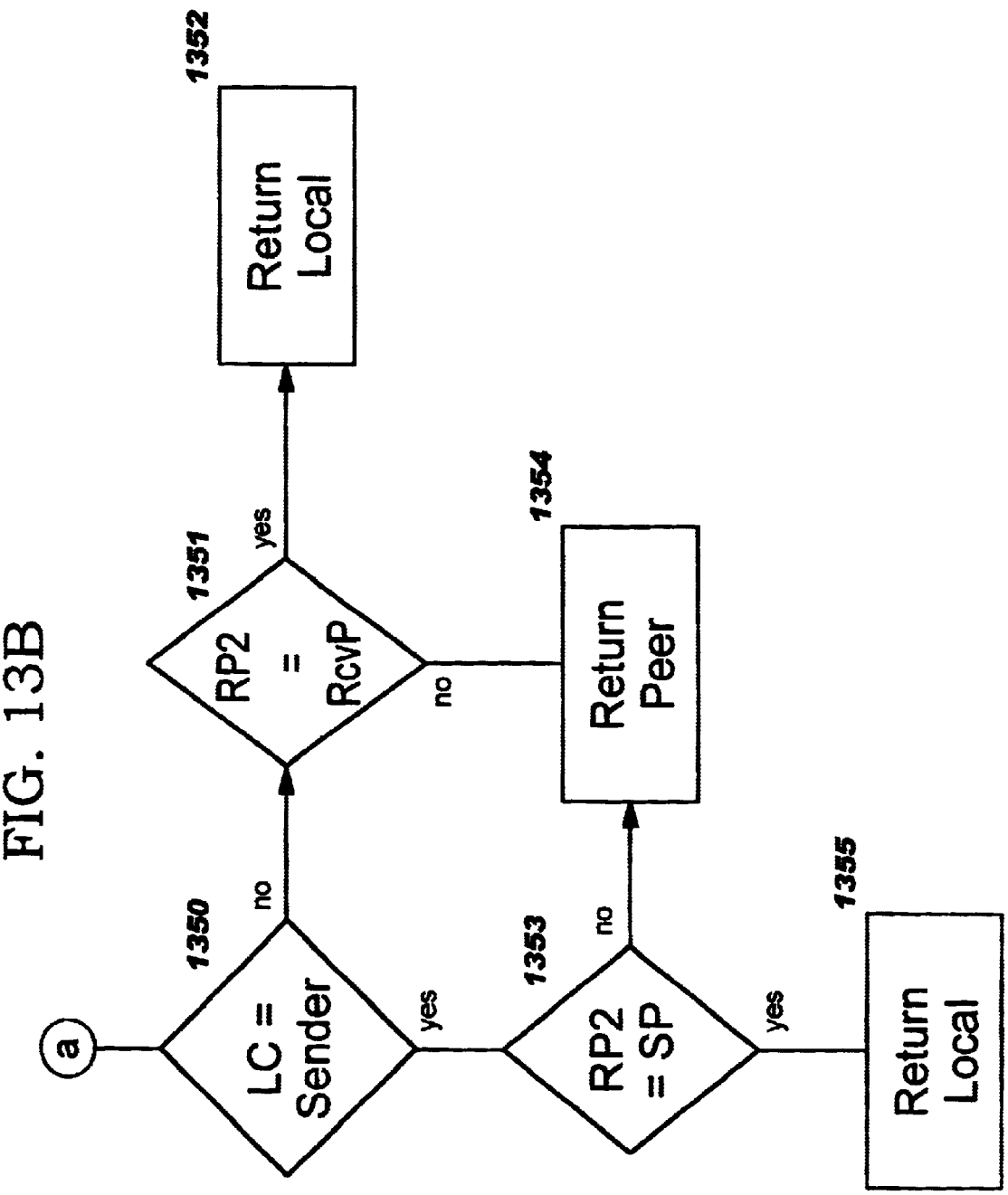

Turning now to FIG. 13B, it is known that the local rank proposal is "LP", and that the remote proposal is not "RP". Block 1350 asks if the local application is currently acting in the role of Sender. If it is, and the remote rank proposal was for the sender to be the primary (Block 1353), then both parties are in agreement that the local application will control in ranking contests. Accordingly, "local" is returned as the RRA outcome at block 1355. If the test at Block 1353 is negative, then the parties are in conflict about ranking outcomes, so "peer" is returned at Block 1354.

When the test at Block 1350 is negative, then the local application is currently acting as a Receiver. Control transfers to Block 1351, which tests whether the remote rank proposal was for the receiver to be primary. When this is true, then both parties are in agreement that the local application should be primary, and "local" is returned at Block 1352. Otherwise, the parties are in conflict, and Block 1354 returns "peer" as the RRA outcome.

Returning now to FIG. 13A, Block 1308 is reached when the local rank proposal was other than "LP" (from Block 1302). Block 1308 tests to see if it was "RP". If it was, and if the remote proposal was "LP" (Block 1310), then the parties are in agreement that the remote application should control priority outcome. Accordingly, Block 1312 returns the value "remote". If the remote rank proposal was not "LP", control transfers from Block 1310 to FIG. 13C.

Figure 13C:
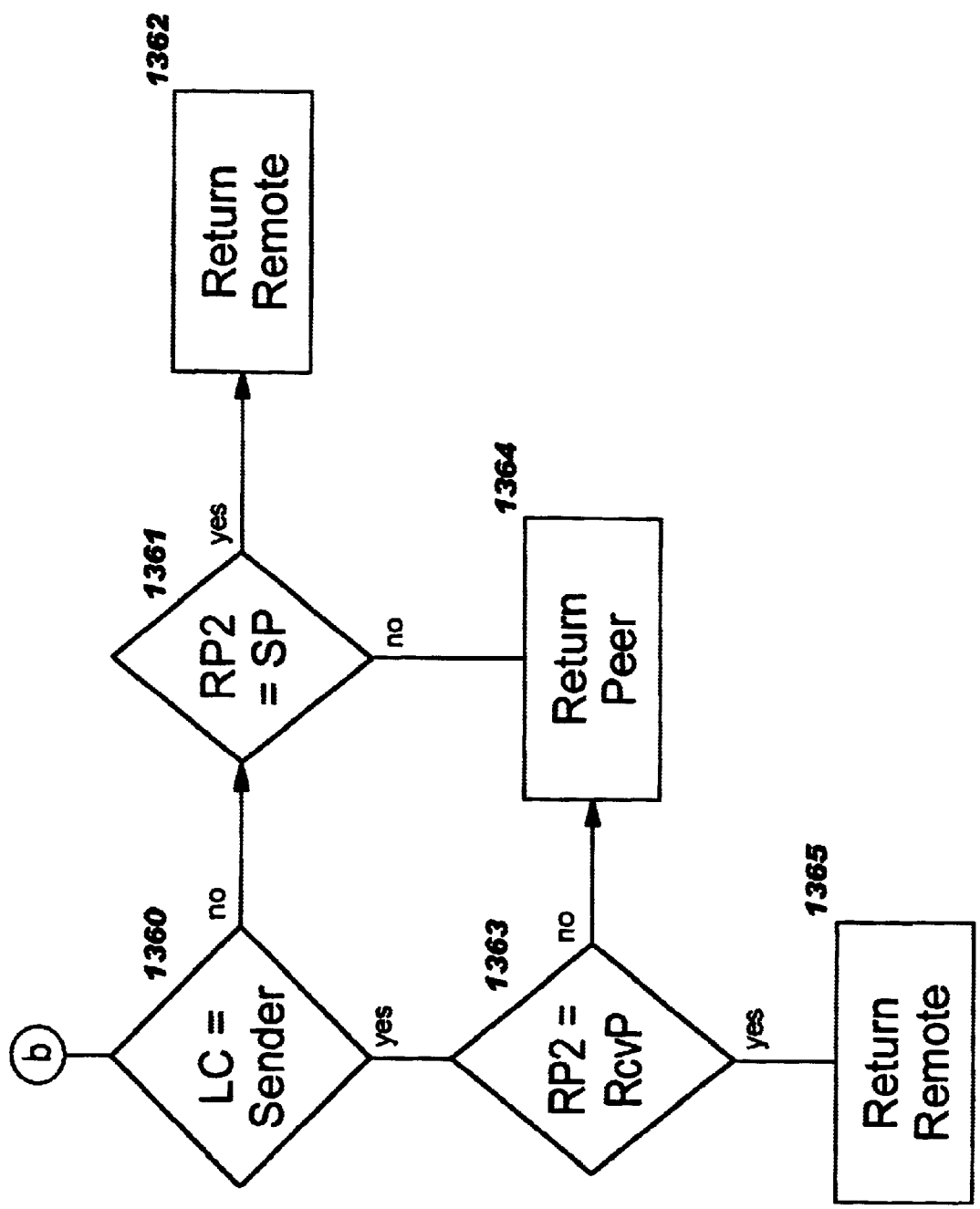

Upon reaching the processing of FIG. 13C, it is known that the local proposal was "RP", and that the remote proposal was other than "LP". Block 1360 of FIG. 13C asks whether the local application is currently acting in the role of Sender. If so, then the remote application is acting as the receiver. Block 1363 asks if the remote application proposed that the receiver should have priority. If this is also true, then the parties are in agreement that the remote application's view of the priority is controlling, and Block 1365 returns the value "remote". If Block 1363 has a negative response, then the parties are in conflict, so "peer" is returned at Block 1364.

When the test at Block 1360 is negative, then the local application is currently acting as a Receiver. Control transfers to Block 1361, which tests whether the remote rank proposal was for the sender to be primary. When this is true, then both parties are in agreement that the remote application (the sender) should be primary, and "remote" is returned at Block 1362. Otherwise, the parties are in conflict, and Block 1364 returns "peer" as the RRA outcome.

Returning again to FIG. 13A, control reaches Block 1314 when the local rank proposal is neither "LP" nor "RP". Block 1314 tests to see if it was "SP". If it was, and if the remote proposal was "SP" (Block 1316), then the parties are in agreement that the sending application should control priority outcome. Accordingly, Block 1318 checks to see if the local application is acting in the role of sender. If so, Block 1322 returns the value "local"; otherwise, Block 1320 returns the value "remote". If the remote rank proposal was not "SP", control transfers from Block 1316 to FIG. 13D.

Figure 13D:
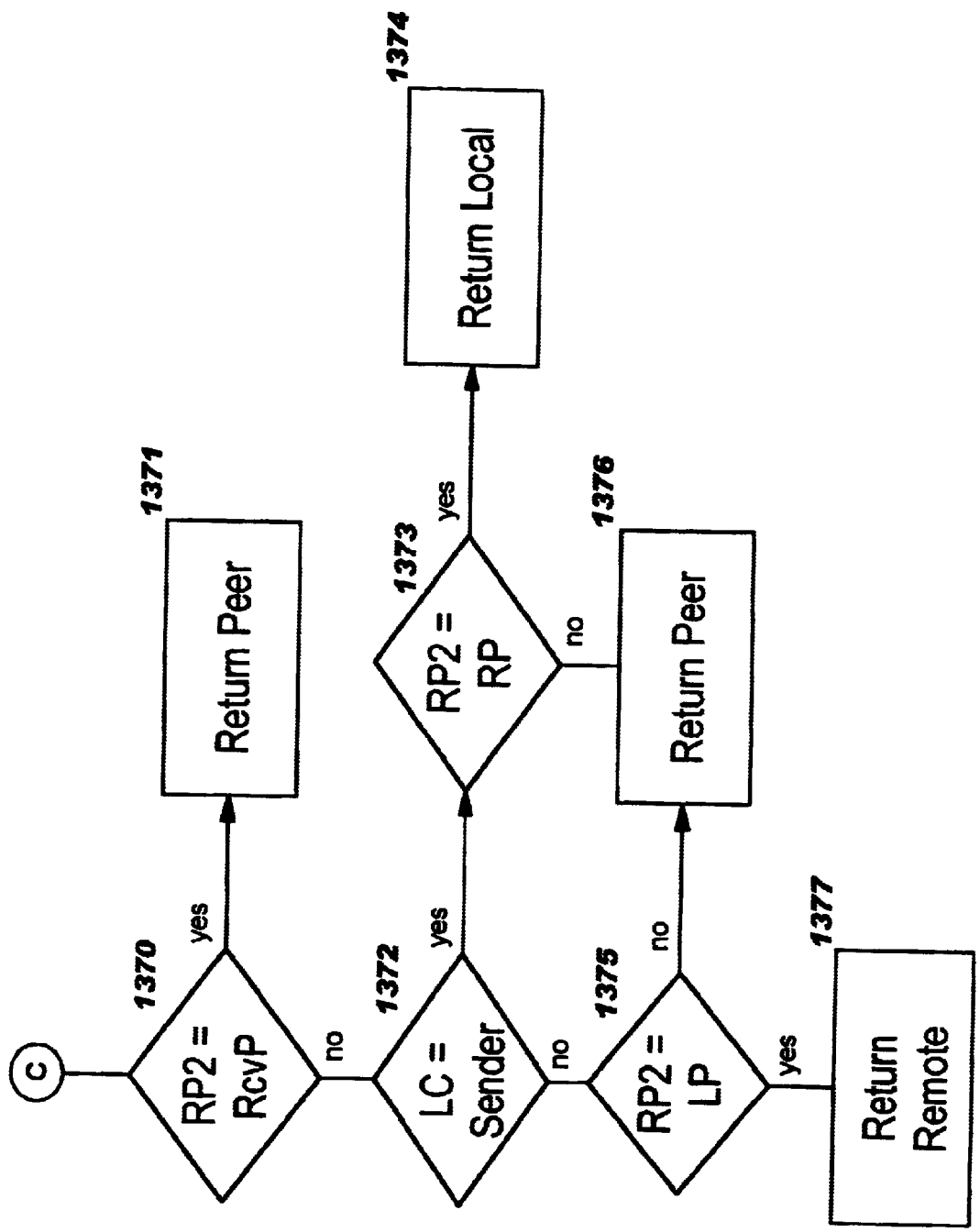

Turning now to FIG. 13D, it is known that the local rank proposal is "SP", and that the remote proposal is not "SP". Block 1370 asks if the remote proposal is "receiver primary". If it is, then the parties are in conflict, and "peer" is returned at Block 1371. Otherwise, Block 1372 asks if the local application is currently acting in the role of Sender. If it is, and the remote rank proposal was "RP" (Block 1373), then both parties are in agreement that the local application will control in ranking contests. Accordingly, "local" is returned as the RRA outcome at Block 1374. If the test at Block 1373 is negative, then the parties are in conflict about ranking outcomes, so "peer" is returned at Block 1376. If the test at Block 1372 has a negative response, then the local application is acting as the receiver, when it has proposed (with RP1="SP") that the sender should have precedence. If the remote application proposed that it should have precedence (RP2="LP" at Block 1375), then the parties are in agreement, and "remote" is returned at Block 1377. When the remote application did not propose to have precedence, Block 1375 has a negative response, and Block 1376 returns "peer" because the parties are in conflict.

Returning now to FIG. 13A, Block 1324 is reached when the local rank proposal was either "RcvP" or "P". If it was not "RcvP", the test at Block 1324 is negative, and "peer" is returned at Block 1332. Otherwise, processing for the "RP1=RcvP" proposal continues at Block 1326. If the remote proposal is also "RcvP" (Block 1326), the parties are in agreement that the receiver will have precedence. Accordingly, Block 1328 checks to see if the local application is acting as a receiver. If so, then "local" is returned as the RRA outcome at Block 1322; otherwise, "remote" is returned at Block 1330. If the remote proposal was not "RcvP", then Block 1326 has a negative result, and processing continues by transferring control to FIG. 13E.

Figure 13E:
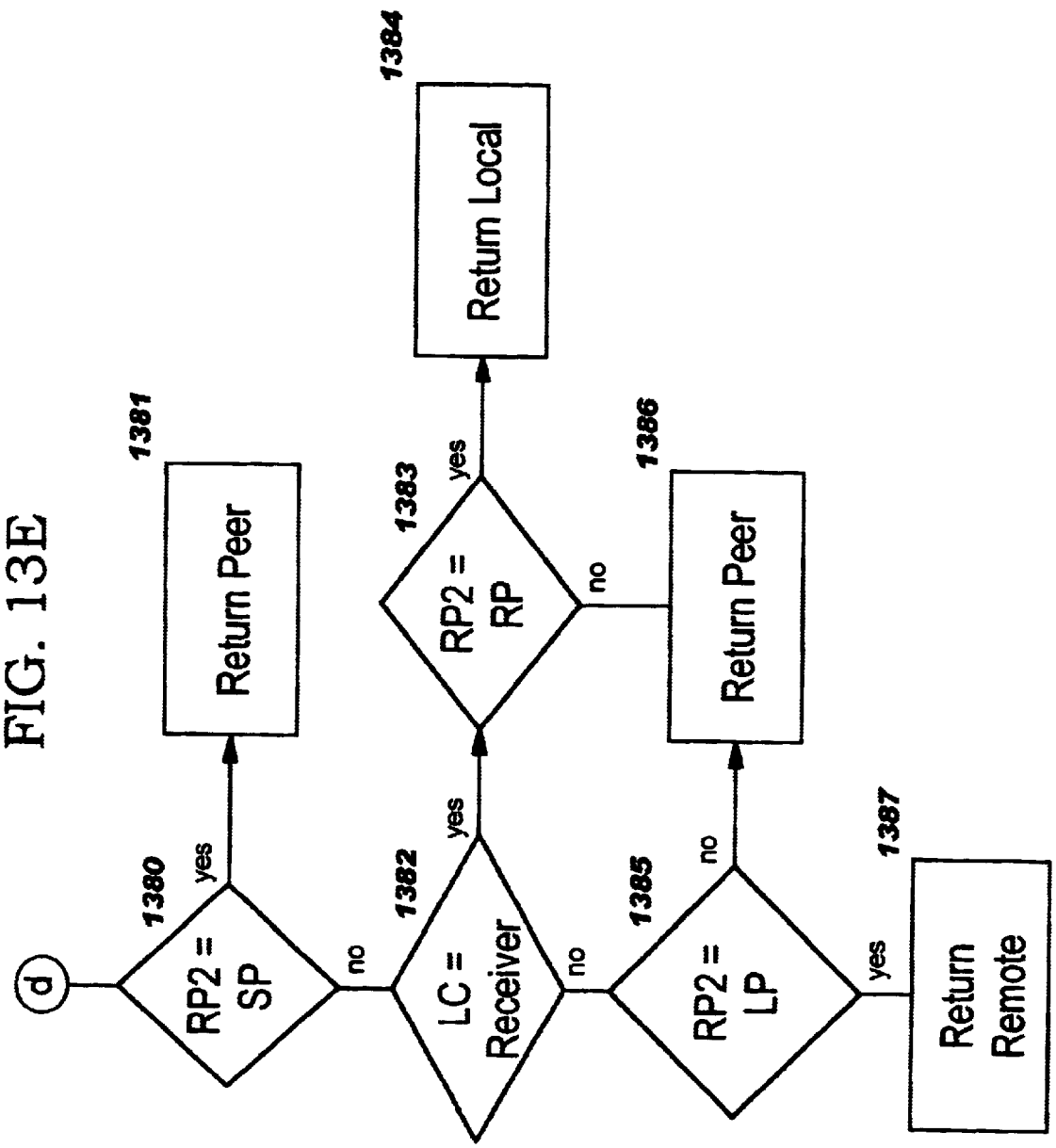

Upon reaching FIG. 13E, it is known that RP1 was "RcvP", and that RP2 was not. Block 1380 checks to see if the RP2 value was "SP". If so, the parties are in conflict, and Block 1381 returns "peer" as the RRA outcome. When the RP2 value was not "SP", Block 1382 checks to see if the local application is acting as a receiver. If it is (given that the local rank proposal was for the receiver to control), and the remote rank proposal was "RP" (Block 1383), then both parties are in agreement that the local application will control in ranking contests. Accordingly, "local" is returned as the RRA outcome at Block 1384. If the test at Block 1383 is negative, then the parties are in conflict about ranking outcomes, so "peer" is returned at Block 1386. If the test at Block 1382 has a negative response, then the local application is acting as the sender, when it has proposed (with RP1="RcvP") that the receiver should have precedence. If the remote application proposed that it should have precedence (RP2="LP" at Block 1385), then the parties are in agreement, and "remote" is returned at Block 1387. When the remote application did not propose to have precedence, Block 1385 has a negative response, and Block 1386 returns "peer" as the RRA outcome because the parties are in conflict.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

We claim:

1. In a computing environment connected to a network, computer readable code readable by a computer system in said environment, for implementing a scheduling system that allows a sender and a receiver to change priorities of queued messages, comprising:

a subprocess operating at said sender for creating a plurality of data objects by a sending application for sending to a receiving application operating at said receiver, wherein each of said data objects comprises one or more messages;

a subprocess for queuing said messages created by said sending application in a first persistent message store at said sender, prior to sending said messages to said receiver over said network;

a subprocess for receiving said sent messages and queuing said received messages in a second persistent message store at said receiver, prior to delivering said queued messages to said receiving application;

a subprocess for requesting a change from an existing priority of a specified data object to a new priority, wherein said specified data object may be represented by one or more of said queued messages in said first message store or in said second message store or in both of said message stores;

a subprocess for locating any of said queued messages representing said specified data object;

a subprocess for determining if said existing priority of said data object will be changed to said new priority; and a subprocess for modifying an order of delivery of said located messages when said subprocess for determining has a positive response.

2. Computer readable code for implementing a scheduling system that allows a sender and a receiver to change priorities of queued messages according to claim 1, wherein said subprocess for modifying further comprises changing a priority of each of said located messages to said new priority.

3. Computer readable code for implementing a scheduling system that allows a sender and a receiver to change priorities of queued messages according to claim 1, wherein said subprocess for determining further comprises using a priority resolution subprocess that determines, based on (1) whether said sending application or said receiving application set said existing priority and (2) rank proposals established by said sending application and said receiving application, whether said existing priority should be changed.

4. Computer readable code for implementing a scheduling system that allows a sender and a receiver to change priorities of queued messages according to claim 3, wherein said rank proposals are exchanged at least once between said sender and said receiver.

5. Computer readable code for implementing a scheduling system that allows a sender and a receiver to change priorities of queued messages according to claim 4, wherein said rank proposals are one of local primary, remote primary, sender primary, receiver primary, and peer.

6. Computer readable code for implementing a scheduling system that allows a sender and a receiver to change priorities of queued messages according to claim 2, further comprising a subprocess for issuing an advance notification of an intended priority to be used as said existing priority for a subsequently-sent data object.

7. Computer readable code for implementing a scheduling system that allows a sender and a receiver to change priorities of queued messages according to claim 2, wherein said subprocess for requesting a change further comprises a subprocess for accepting said change request from a user of either said sending application or said receiving application.

8. A system for implementing a scheduling system that allows a sender and a receiver to change priorities of queued messages using dynamic environmental factors in a computing environment connected to a network, comprising:

a sending application operating at said sender;

a receiving application operating at said receiver;

means for creating a plurality of data objects by said sending application for sending to said receiving application, wherein each of said data objects comprises one or more messages;

means for queuing said messages created by said sending application in a first persistent message store at said sender, prior to sending said messages to said receiver over said network;

means for receiving said sent messages and queuing said received messages in a second message store at said receiver, prior to delivering said queued messages to said receiving application;

means for requesting a change from an existing priority of a specified data object to a new priority, wherein said specified data object may be represented by one or more of said queued messages in said first message store or in said second message store or in both of said message stores;

means for locating any of said queued messages representing said specified data object;

means for determining if said existing priority of said data object will be changed to said new priority; and means for modifying an order of delivery of said located messages when said means for determining has a positive response.

9. The system for implementing a scheduling system that allows a sender and a receiver to change priorities of queued messages according to claim 8, wherein said means for modifying further comprises changing a priority of each of said located messages to said new priority.

10. The system for implementing a scheduling system that allows a sender and a receiver to change priorities of queued messages according to claim 8, wherein said means for determining further comprises means for performing a priority resolution to determine, based on (1) whether said sending application or said receiving application set said existing priority and (2) rank proposals established by said sending application and said receiving application, whether said existing priority should be changed.

11. The system for implementing a scheduling system that allows a sender and a receiver to change priorities of queued messages according to claim 10, wherein said rank proposals are exchanged at least once between said sender and said receiver.

12. The system for implementing a scheduling system that allows a sender and a receiver to change priorities of queued messages according to claim 11, wherein said rank proposals are one of: local primary, remote primary, sender primary, receiver primary, and peer.

13. The system for implementing a scheduling system that allows a sender and a receiver to change priorities of queued messages according to claim 9, further comprising means for issuing an advance notification of an intended priority to be used as said existing priority for a subsequently-sent data object.

14. The system for implementing a scheduling system that allows a sender and a receiver to change priorities of queued messages according to claim 9, wherein said means for requesting a change further comprises means for accepting said change request from a user of either said sending application or said receiving application.

15. A method for implementing a scheduling system that allows a sender and a receiver to change priorities of queued messages in a computing environment connected to a network, comprising the steps of:

operating a sending application at said sender;

operating a receiving application at said receiver;

creating a plurality of data objects by said sending application for sending to said receiving application, wherein each of said data objects comprises one or more messages;

queuing said messages created by said sending application in a first persistent message store at said sender, prior to sending said messages to said receiver over said network;

receiving said sent messages and queuing said received messages in a second persistent message store at said receiver, prior to delivering said queued messages to said receiving application;

requesting a change from an existing priority of a specified data object to a new priority, wherein said specified data object may be represented by one or more of said queued messages in said first message store or in said second message store or in both of said message stores;

locating any of said queued messages representing said specified data object;

determining if said existing priority of said data object will be changed to said new priority; and modifying an order of delivery of said located messages when said determining step has a positive response.

16. The method for implementing a scheduling system that allows a sender and a receiver to change priorities of queued messages according to claim 15, wherein said modifying step further comprises changing a priority of each of said located messages to said new priority.

17. The method for implementing a scheduling system that allows a sender and a receiver to change priorities of queued messages according to claim 15, wherein said determining step further comprises performing a priority resolution to determine, based on (1) whether said sending application or said receiving application set said existing priority and (2) rank proposals established by said sending application and said receiving application, whether said existing priority should be changed.

18. The method for implementing a scheduling system that allows a sender and a receiver to change priorities of queued messages according to claim 17, wherein said rank proposals are exchanged at least once between said sender and said receiver.

19. The method for implementing a scheduling system that allows a sender and a receiver to change priorities of queued messages according to claim 18, wherein said rank proposals are one of: local primary, remote primary, sender primary, receiver primary, and peer.

20. The method for implementing a scheduling system that allows a sender and a receiver to change priorities of queued messages according to claim 16, further comprising issuing an advance notification of an intended priority to be used as said existing priority for a subsequently-sent data object.

21. The method for implementing a scheduling system that allows a sender and a receiver to change priorities of queued messages according to claim 16, wherein said requesting a change step further comprises accepting said change request from a user of either said sending application or said receiving application.

22. A method of dynamically changing priority of in-transit messages communicated over a network from a sender to a receiver in a computing environment, comprising the steps of:

queuing messages for sending from the sender to the receiver over the network, and queuing the messages upon receiving them over the network at the receiver, wherein each of the queued messages has an associated priority;

selecting to modify the priority associated with a particular message, whether one or more segments of the particular message are queued in a first message store used for queuing messages at the sender, a second message store used for queuing messages at the receiver, or both the first and the second message stores; and delivering the segments of the particular message to the receiver using the modified priority.

* * * * *